US008443015B2

(12) United States Patent
Morita

(10) Patent No.: US 8,443,015 B2
(45) Date of Patent: May 14, 2013

(54) APPARATUS AND METHOD FOR PROVIDING CONTENT AND CONTENT ANALYSIS RESULTS

(75) Inventor: Toshihiro Morita, Kanagawa (JP)

(73) Assignee: Sony Corporation (JP)

( * ) Notice: Subject to any disclaimer, the term of this patent is extended or adjusted under 35 U.S.C. 154(b) by 417 days.

(21) Appl. No.: 12/587,132

(22) Filed: Oct. 2, 2009

(65) Prior Publication Data

US 2010/0088275 A1 Apr. 8, 2010

(30) Foreign Application Priority Data

Oct. 3, 2008 (JP) ................................ P2008-258597

(51) Int. Cl.
*G06F 17/30* (2006.01)

(52) U.S. Cl.
USPC ........... 707/913; 707/914; 707/915; 707/916; 725/9; 725/25; 725/32; 725/33; 725/34

(58) Field of Classification Search .................. 707/914, 707/915, 916; 725/9, 25, 32, 33, 34
See application file for complete search history.

(56) References Cited

U.S. PATENT DOCUMENTS

| | | | | |
|---|---|---|---|---|
| 6,374,260 | B1 * | 4/2002 | Hoffert et al. | 1/1 |
| 8,028,312 | B2 * | 9/2011 | Matsumoto et al. | 725/9 |
| 2005/0080788 | A1 * | 4/2005 | Murata | 707/10 |
| 2007/0101387 | A1 * | 5/2007 | Hua et al. | 725/113 |
| 2008/0056675 | A1 * | 3/2008 | Wright et al. | 386/95 |
| 2009/0151547 | A1 | 6/2009 | Kobayashi | |

FOREIGN PATENT DOCUMENTS

| | | | |
|---|---|---|---|
| JP | 2001-297093 | A | 10/2001 |
| JP | 2002049626 | A | 2/2002 |
| JP | 2005-071227 | A | 3/2005 |
| JP | 2007140648 | A | 6/2007 |
| JP | 2007-183417 | A | 7/2007 |
| JP | 2007234072 | A | 9/2007 |
| JP | 2008065055 | A | 3/2008 |
| JP | 2008090612 | A | 4/2008 |
| JP | 2008123546 | A | 5/2008 |
| JP | 2008234419 | A | 10/2008 |

OTHER PUBLICATIONS

Office Action from Japanese Application No. 2008-258597, dated Oct. 5, 2010.

* cited by examiner

*Primary Examiner* — Cheyne Ly
(74) *Attorney, Agent, or Firm* — Lerner, David, Littenberg, Krumholz & Mentlik, LLP

(57) ABSTRACT

An information processing apparatus acquires and transmits content identification information stored in the storage unit to the other apparatus, determines whether the information processing apparatus has received the content analysis results from the other apparatus and if it is determined that the content analysis result acquisition unit has received the content analysis results from the other apparatus, causes the storage unit to store the content analysis results and if it is determined that the information processing apparatus has not received the content analysis results from the other apparatus, perform processing to obtain content analysis results by analyzing the content data stored in the storage unit to cause the storage unit to store the content analysis results by associating with the content data stored in the storage unit and also perform processing to transmit the content analysis results to the other apparatus.

12 Claims, 37 Drawing Sheets

| MANAGEMENT ID (152a) | CONTENT NAME (152b) | PACKAGE NAME (152c) | TRACK NUMBER (152d) | CONTENT FILE NAME (152e) | CONTENT ID (152f) | CONTENT ANALYSIS RESULT EMBEDDED INFORMATION (152g) |
|---|---|---|---|---|---|---|
| 101 | AAA | PACKAGE 1 | 1 | C:¥1¥AAA.OMA | CID11023 | 1(EMBEDDED) |
| 102 | BBB | PACKAGE 1 | 2 | C:¥1¥BBB.OMA | CID11024 | 1(EMBEDDED) |
| 103 | CCC | PACKAGE 1 | 3 | C:¥1¥CCC.OMA | CID11025 | 1(EMBEDDED) |
| 104 | DDD | PACKAGE 1 | 4 | C:¥1¥DDD.OMA | CID11026 | 1(EMBEDDED) |
| 105 | EEE | PACKAGE 2 | 1 | C:¥2¥EEE.OMA | CID11027 | 0(NOT EMBEDDED) |
| 106 | FFF | PACKAGE 2 | 2 | C:¥2¥FFF.OMA | CID11028 | 0(NOT EMBEDDED) |
| 107 | GGG | PACKAGE 2 | 3 | C:¥2¥GGG.OMA | CID11029 | 0(NOT EMBEDDED) |
| 108 | HHH | PACKAGE 2 | 4 | C:¥2¥HHH.OMA | CID11030 | 0(NOT EMBEDDED) |

| IS ANY CONTENT ANALYSIS RESULT PRESENT IN INFORMATION PROVIDING APPARATUS? | USE CONTENT ANALYSIS RESULTS ACQUIRED FROM INFORMATION PROVIDING APPARATUS | PERFORM CONTENT ANALYSIS | TRANSMIT CONTENT ANALYSIS RESULTS TO INFORMATION PROVIDING APPARATUS |
|---|---|---|---|
| YES | ○ | | |
| NO | | ○ | ○ |

FIG.26

| IS ANY CONTENT ANALYSIS RESULT PRESENT IN INFORMATION PROVIDING APPARATUS? | IS ANY CONTENT ANALYSIS RESULT PRESENT IN CONTENT FILE? | USE CONTENT ANALYSIS RESULTS ACQUIRED FROM INFORMATION PROVIDING APPARATUS | USE CONTENT ANALYSIS RESULTS ACQUIRED FROM CONTENT FILE | PERFORM CONTENT ANALYSIS | TRANSMIT CONTENT ANALYSIS RESULTS TO INFORMATION PROVIDING APPARATUS |
|---|---|---|---|---|---|
| YES | YES | | O | | |
| YES | NO | O | | | |
| NO | YES | | O | | O |
| NO | NO | | | O | O |

FIG.28

| IS ANY CONTENT ANALYSIS RESULT PRESENT IN INFORMATION PROVIDING APPARATUS? | IS ANY CONTENT ANALYSIS RESULT PRESENT IN CONTENT FILE? | USE CONTENT ANALYSIS RESULTS ACQUIRED FROM INFORMATION PROVIDING APPARATUS | USE CONTENT ANALYSIS RESULTS ACQUIRED FROM CONTENT FILE | PERFORM CONTENT ANALYSIS | TRANSMIT CONTENT ANALYSIS RESULTS TO INFORMATION PROVIDING APPARATUS |
|---|---|---|---|---|---|
| YES | YES | | O | | |
| YES | NO | O | | | |
| NO | YES | | O | | |
| NO | NO | | | O | O |

FIG.30

| IS ANY CONTENT ANALYSIS RESULT PRESENT IN INFORMATION PROVIDING APPARATUS? | USE CONTENT ANALYSIS RESULTS ACQUIRED FROM INFORMATION PROVIDING APPARATUS | PERFORM CONTENT ANALYSIS | TRANSMIT CONTENT ANALYSIS RESULTS TO INFORMATION PROVIDING APPARATUS |
|---|---|---|---|
| YES | ○ | | △ |
| NO | | ○ | ○ |

FIG.32

| IS ANY CONTENT ANALYSIS RESULT PRESENT IN INFORMATION PROVIDING APPARATUS? | IS ANY CONTENT ANALYSIS RESULT PRESENT IN CONTENT FILE? | USE CONTENT ANALYSIS RESULTS ACQUIRED FROM INFORMATION PROVIDING APPARATUS | USE CONTENT ANALYSIS RESULTS ACQUIRED FROM CONTENT FILE | PERFORM CONTENT ANALYSIS | TRANSMIT CONTENT ANALYSIS RESULTS TO INFORMATION PROVIDING APPARATUS |
|---|---|---|---|---|---|
| YES | YES (INFORMATION PROCESSING APPARATUS) | | O | | |
| YES | YES (MOBILE TERMINAL) | | | O | O |
| YES | NO | O | | | |
| NO | YES (INFORMATION PROCESSING APPARATUS) | | O | | O |
| NO | YES (MOBILE TERMINAL) | | | O | O |
| NO | NO | | | O | O |

APPARATUS AND METHOD FOR PROVIDING CONTENT AND CONTENT ANALYSIS RESULTS

CROSS-REFERENCE TO RELATED APPLICATION

The present application claims priority from Japanese Patent Application No. JP 2008-258597 filed in the Japanese Patent Office on Oct. 3, 2008, the entire content of which is incorporated herein by reference.

BACKGROUND OF THE INVENTION

1. Field of the Invention

The present invention relates to an information processing apparatus, information processing method, information processing program, information providing apparatus, information providing method, information providing program and information processing system.

2. Description of the Related Art

Technology to analyze content constituted by audio information or the like has been known (see, for example, Japanese Patent Application Laid-Open No. 2007-183417). An apparatus, a terminal or the like that reproduces content can provide a reproduction technology of more convenient content by using results of analyzing the content (and reproducing the content hereinafter, referred to as "content analysis results").

Processing to analyze content is performed by inputting PCM (Pulse Code Modulation) data obtained by decoding the content into an analysis engine. It takes up to about 10 sec to analyze each piece of content and there is an issue that it takes so long to analyze content when many pieces of content are analyzed. Moreover, when content is analyzed, loads on a CPU increase so that there is an issue that it is difficult to perform another operation in an apparatus that is analyzing content during analysis of content.

To solve the above issues, a technology is disclosed in which content analysis results are accumulated in an information providing apparatus (such as a server) in advance and content analysis results accumulated in the information providing apparatus are retrieved based on content identification information that can identify content. However, the technology to accumulate content analysis results in the information providing apparatus in advance has an issue that it is difficult to reproduce content by using a content analysis result not accumulated in the information providing apparatus. Thus, it is important to accumulate as many content analysis results as possible in the information providing apparatus.

Therefore, a technology to analyze content when the content is loaded (during ripping) from a recording medium into an information processing apparatus such as a PC (Personal Computer) and to upload analysis results to the information processing apparatus.

SUMMARY OF THE INVENTION

However, the user rarely rips content loaded into an information processing apparatus and thus, there is an issue that efficiency of collection of content analysis results is low even if content analysis results are uploaded to the information providing apparatus during ripping.

The present invention has been made in view of the above issues and it is desirable to provide a novel and improved technology capable of reliably using content analysis results when content accumulated in an information processing apparatus is reproduced and improving efficiency of collection of content analysis results in the information processing apparatus and an information providing apparatus.

According to an embodiment of the present invention, there is provided an information processing apparatus including a storage unit that is capable of storing content analysis results, which are results of analyzing content data, and stores the content data and content identification information corresponding to the content data, a content analysis result acquisition unit that acquires and transmits the content identification information stored in the storage unit to another apparatus and, if the other apparatus holds content analysis results, which are results of analyzing content data corresponding to the content identification information, is capable of receiving the content analysis results from the other apparatus, a content analysis unit capable of obtaining content analysis results by analyzing the content data stored in the storage unit, a content analysis result transmission unit capable of transmitting content analysis results obtained by analysis by the content analysis unit to the other apparatus, and a control unit that causes the content analysis result acquisition unit to perform processing to acquire and transmit the content identification information stored in the storage unit to the other apparatus, determines whether the content analysis result acquisition unit has received the content analysis results from the other apparatus and if it is determined that the content analysis result acquisition unit has received the content analysis results from the other apparatus, causes the storage unit to store the content analysis results by associating with the content data stored in the storage unit and if it is determined that the content analysis result acquisition unit has not received the content analysis results from the other apparatus, causes the content analysis unit to perform processing to obtain content analysis results by analyzing the content data stored in the storage unit to cause the storage unit to store the content analysis results obtained by the content analysis unit by associating with the content data stored in the storage unit and also causes the content analysis result transmission unit to perform processing to transmit the content analysis results to the other apparatus.

Furthermore, according to another embodiment of the present invention, there is provided an information processing apparatus including a storage unit that is capable of storing content analysis results, which are results of analyzing content data, and stores the content data, a content analysis result acquisition/content analysis unit that can start analysis of the content data while generating content identification information based on partial content data corresponding from a head to a predetermined position of the content data stored in the storage unit, transmit the content identification information to another apparatus when generation of the content identification information is completed, if content analysis results, which are results of analyzing content data corresponding to the content identification information, are held by the other apparatus, stop analysis of the content data by receiving the content analysis results from the other apparatus, and if the other apparatus does not hold the content analysis results, obtain content analysis results by continuing analysis of the content data, a content analysis result transmission unit capable of transmitting content analysis results obtained by analysis by the content analysis result acquisition/content analysis unit to the other apparatus, and a control unit that causes the content analysis result acquisition/content analysis unit to perform processing to generate and transmit the content identification information to the other apparatus and processing to start analysis of content data corresponding to the content identification information, determines whether the content analysis result acquisition/content analysis unit has received the content analysis results from the other apparatus and if it is determined that the content analysis result acquisition/content analysis unit has received the content analysis results from the other apparatus, causes the storage unit to store the content analysis results by associating with the content data stored in the storage unit and if it is determined that the content analysis result acquisition/content analysis unit has not received the content analysis results from the other apparatus, causes the storage unit to store the content analysis results obtained by the content analysis result acquisition/content analysis unit by associating with the content data stored in the storage unit and also causes the content analysis result transmission unit to perform processing to transmit the content analysis results to the other apparatus.

According to the present invention, as described above, a technology capable of using content analysis results when content accumulated in an information processing apparatus is reproduced and improving efficiency of collection of content analysis results in the information providing apparatus can be provided.

BRIEF DESCRIPTION OF THE DRAWINGS

FIG. 5 is a diagram exemplifying the structure of a content related information according to the first embodiment of the present invention;

FIG. 20 is a table showing a summary of processing for one piece of content performed by the control unit of the information processing apparatus according to the first embodiment of the present invention;

FIG. 26 is a table showing a summary of processing for one piece of content performed by the control unit of the information processing apparatus according to the first modification of the first embodiment of the present invention;

FIG. 28 is a table showing a summary of processing for one piece of content performed by the control unit of the information processing apparatus according to the second modification of the first embodiment of the present invention;

FIG. 30 is a table showing a summary of processing for one piece of content performed by the content analysis result search unit of the information processing apparatus according to the third modification of the first embodiment of the present invention;

FIG. 32 is a table showing a summary of processing for one piece of content performed by the control unit of the information processing apparatus according to the fourth modification of the first embodiment of the present invention;

DETAILED DESCRIPTION OF EMBODIMENT

Figure 1:
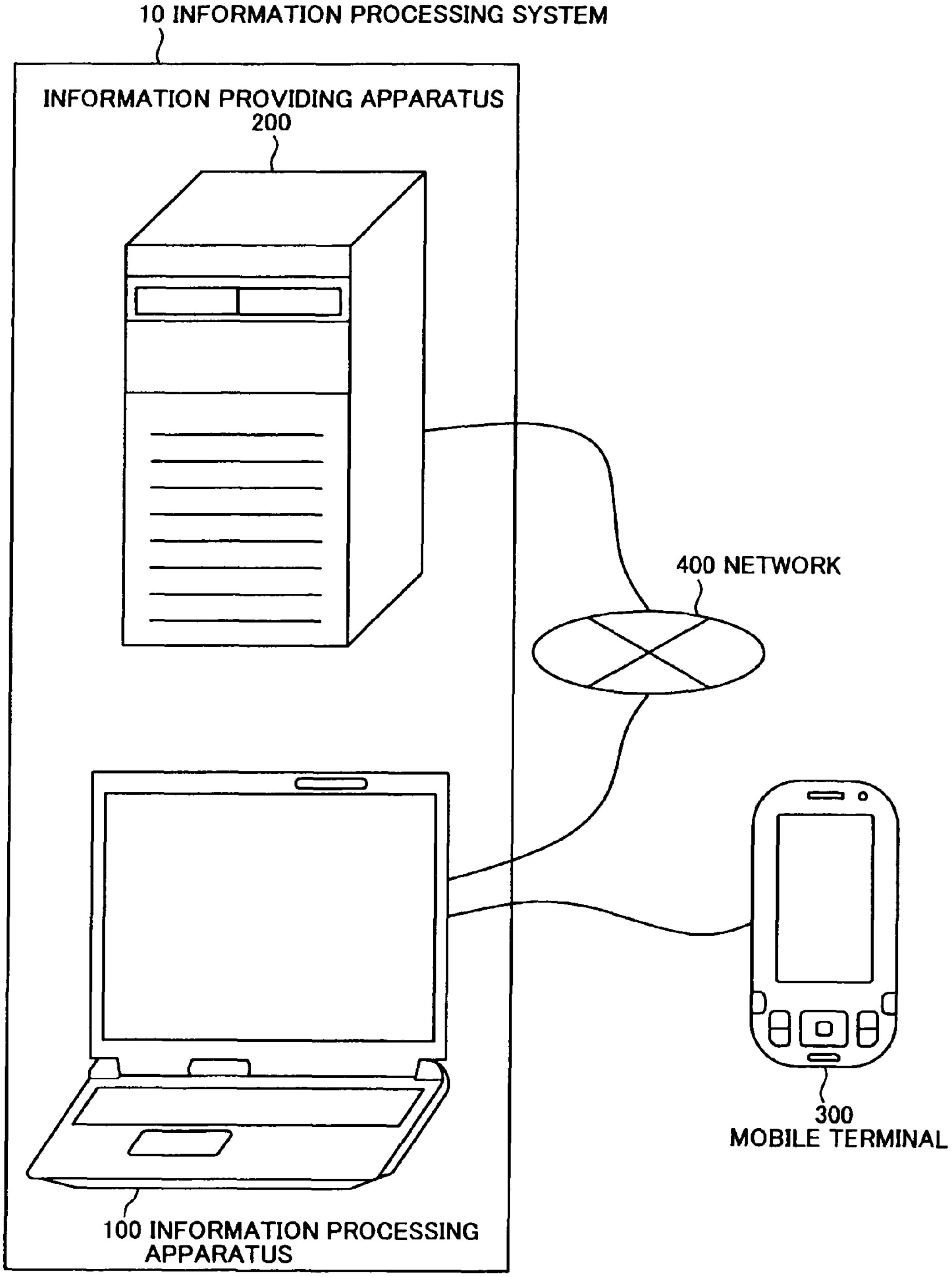
FIG. 1 is a diagram showing the configuration of an information processing system according to a first embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted. The description will be provided in the order shown below:

1. First embodiment
2. First modification of the first embodiment
3. Second modification of the first embodiment
4. Third modification of the first embodiment
5. Fourth modification of the first embodiment
6. Fifth modification of the first embodiment
7. Second embodiment

First Embodiment

[Configuration of an Information Processing System]

First, an information processing system according to a first embodiment of the present invention will be described. FIG. 1 is a diagram showing the configuration of an information processing system 10 according to the first embodiment of the present invention. The information processing system 10 according to the first embodiment of the present invention will be described below using FIG. 1.

As shown in FIG. 1, the information processing system 10 according to the first embodiment of the present invention includes an information processing apparatus 100 and an information providing apparatus 200. The information processing system 10 shown in FIG. 1 exchanges content analysis results between the information processing apparatus 100 and the information providing apparatus 200 via a network 400. For example, the information processing apparatus 100 can transmit content analysis results obtained by analyzing content by the local apparatus or those accumulated in the local apparatus to the information providing apparatus 200 or the information providing apparatus 200 can transmit content analysis results accumulated in the local apparatus to the information processing apparatus 100.

A mobile terminal 300 is made communicable with the information processing apparatus 100. Content can be exchanged between the information processing apparatus 100 and the mobile terminal 300. For example, content loaded into the information processing apparatus 100 from a compact disk (CD) can be transferred to the mobile terminal 300 or content downloaded from a server of a music delivery operator into the mobile terminal 300 via a communication network can be backed up in the information processing apparatus 100. The information processing apparatus 100 and the mobile terminal 300 can be connected by, for example, a USB (Universal Serial Bus) cable or a cable compatible with IEEE1394. Moreover, just like between the information processing apparatus 100 and the information providing apparatus 200, content analysis results can be exchanged between the information processing apparatus 100 and the mobile terminal 300. For example, the information processing apparatus 100 can transmit content analysis results obtained by analyzing content by the local apparatus or those accumulated in the local apparatus to the mobile terminal 300 or the mobile terminal 300 can transmit content analysis results obtained by analyzing content by the local apparatus or those accumulated in the local apparatus to the information processing apparatus 100.

The information processing apparatus 100 is a device used by internally storing various kinds of information, for example, a personal computer (PC). The internal configuration of the information processing apparatus 100 will be described in detail later.

The information providing apparatus 200 is a computer that provides a function or data held by the information providing apparatus 200 to the information processing apparatus 100 in response to a request from the information processing apparatus 100. The internal configuration of the information providing apparatus 200 will be described in detail later.

The mobile terminal 300 is a small terminal to be carried like a mobile phone, mobile game machine, and a mobile content reproducing apparatus. In the present embodiment, a mobile content reproducing apparatus (reproducing terminal) is taken as an example of the mobile terminal 300. The internal configuration of the mobile terminal 300 will be described in detail later.

The network 400 is a communication network that connects the information processing apparatus 100 and the information providing apparatus 200 communicably bi-directionally or uni-directionally. The network 400 includes, for example, a public network such as the Internet, a telephone network, a satellite communication network, and a multicasting communication channel or a dedicated network such as a WAN (Wide Area Network), LAN (Local Area Network), IP-VPN (Internet Protocol-Virtual Private Network), Ethernet (registered trademark), and wireless LAN and it does not matter whether the network is by wired or wireless.

In the foregoing, the information processing system 10 according to an embodiment of the present invention has been described. Next, the configuration of the information processing apparatus 100 according to an embodiment of the present invention will be described.

[Hardware Configuration of the Information Processing Apparatus]

Figure 2:
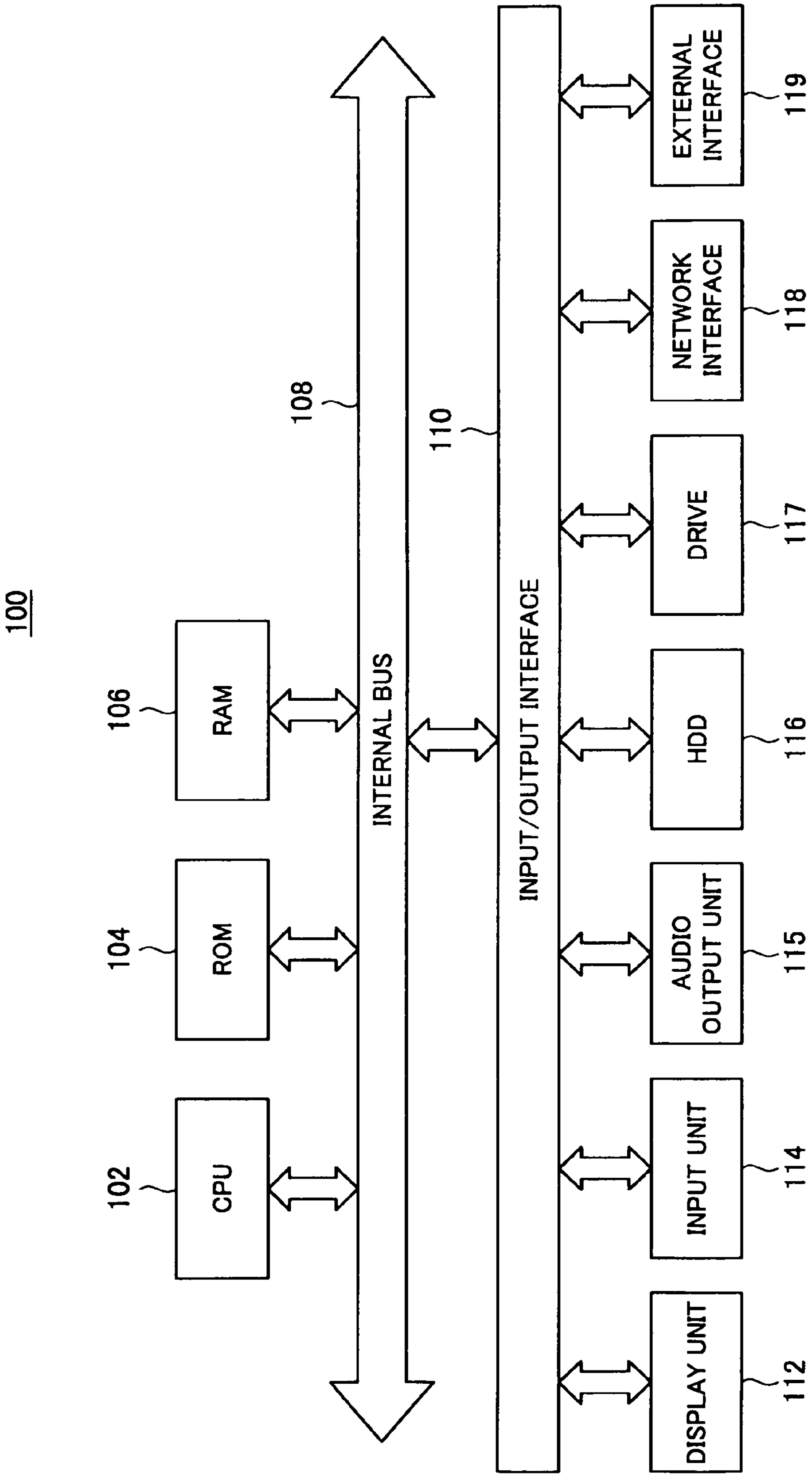
FIG. 2 is a diagram showing the hardware configuration of an information processing apparatus according to the first embodiment of the present invention.

FIG. 2 is a diagram showing the hardware configuration of the information processing apparatus 100 according to the first embodiment of the present invention. The hardware configuration of the information processing apparatus 100 according to the first embodiment of the present invention will be described below using FIG. 2.

As shown in FIG. 2, the information processing apparatus 100 according to the first embodiment of the present invention includes a CPU (Central Processing Unit) 102, a ROM (Read Only Memory) 104, a RAM (Random Access Memory) 106, an internal bus 108, an input/output interface 110, a display unit 112, an input unit 114, an audio output unit 115, an HDD (Hard Disk Drive) 116, a drive 117, a network interface 118, and an external interface 119.

The CPU 102 is used to perform numerical calculations, information processing or device control and performs numerical calculations, information processing or device control by sequentially reading programs stored in the ROM 104 or data stored in the RAM 106, or based on a signal corresponding to an instruction input by the user of the information processing apparatus 100 through the input unit 114 or a signal transmitted from an external device via the network interface 118.

The ROM 104 is used to store, among programs and operation parameters used by the CPU 102 for performing numerical calculations, information processing or device control, fixed data that is basically not changed. The RAM 106 is used to store, among programs and operation parameters used by the CPU 102 for performing numerical calculations, information processing or device control, data that basically changes during various kinds of processing as appropriate.

The internal bus 108 is a pathway used for data exchange inside the information processing apparatus 100. The CPU 102, the ROM 104, and the RAM 106 are mutually connected by the internal bus 108. The internal bus is also connected to the input/output interface 110 and delivers a signal corresponding to an instruction input from the input unit 114 or a signal transmitted from another device connected to the information processing apparatus 100 by a network via the network interface 118 to the CPU 102.

The input/output interface 110 is used to mediate exchange of input/output of information. The input/output interface 110 is connected to the display unit 112, the input unit 114, the audio output unit 115, the drive 117, the network interface 118, and the external interface 119. The input/output interface 110 is also connected to, as described above, the internal bus 108 and delivers a signal corresponding to an instruction input from the input unit 114 or a signal transmitted from another device connected to the information processing apparatus 100 by a network via the network interface 118 to the CPU 102 via the internal bus 108.

The display unit 112 is used to display content input from the input unit 114 or information about results of numerical calculations, information processing or device control performed by the CPU 102. The display unit 112 is constituted by, for example, a liquid crystal display apparatus or an organic EL display apparatus.

The input unit 114 is operated when, for example, the user of the information processing apparatus 100 inputs various instructions to the CPU 102. The input unit 114 includes, for example, buttons, a keyboard, or a touch pad.

The audio output unit 115 is used to output audios generated by processing when the processing accompanied by output of audios in the information processing apparatus 100 is performed. The HDD 116 is provided with a hard disk internally and drives the provided hard disk to record/reproduce programs and information (for example, an audio file or moving image file) read and executed by the CPU 102. The drive 117 has a portable recording medium inserted thereinto and is used to exchange data between the inserted recording medium and the information processing apparatus 100. As the portable recording medium, a magnetic disk, an optical disk, a magneto-optical disk, or a semiconductor memory may be used and an apparatus that can read these recording media is used as the drive 117.

The network interface 118 is used to exchange information between the information processing apparatus 100 and another device connected by a network, for example, the information providing apparatus 200 by wired or wireless. The external interface 119 is used to mediate exchange of information between the information processing apparatus 100 and a peripheral device used by being connected to the information processing apparatus 100 such as the mobile terminal 300. The external interface 119 is constituted by, for example, a USB (Universal Serial Bus) port.

In the foregoing, the hardware configuration of the information processing apparatus 100 according to an embodiment of the present invention has been described. Next, the function configuration of the information processing apparatus 100 according to an embodiment of the present invention will be described.

[Function Configuration of the Information Processing Apparatus]

Figure 3:
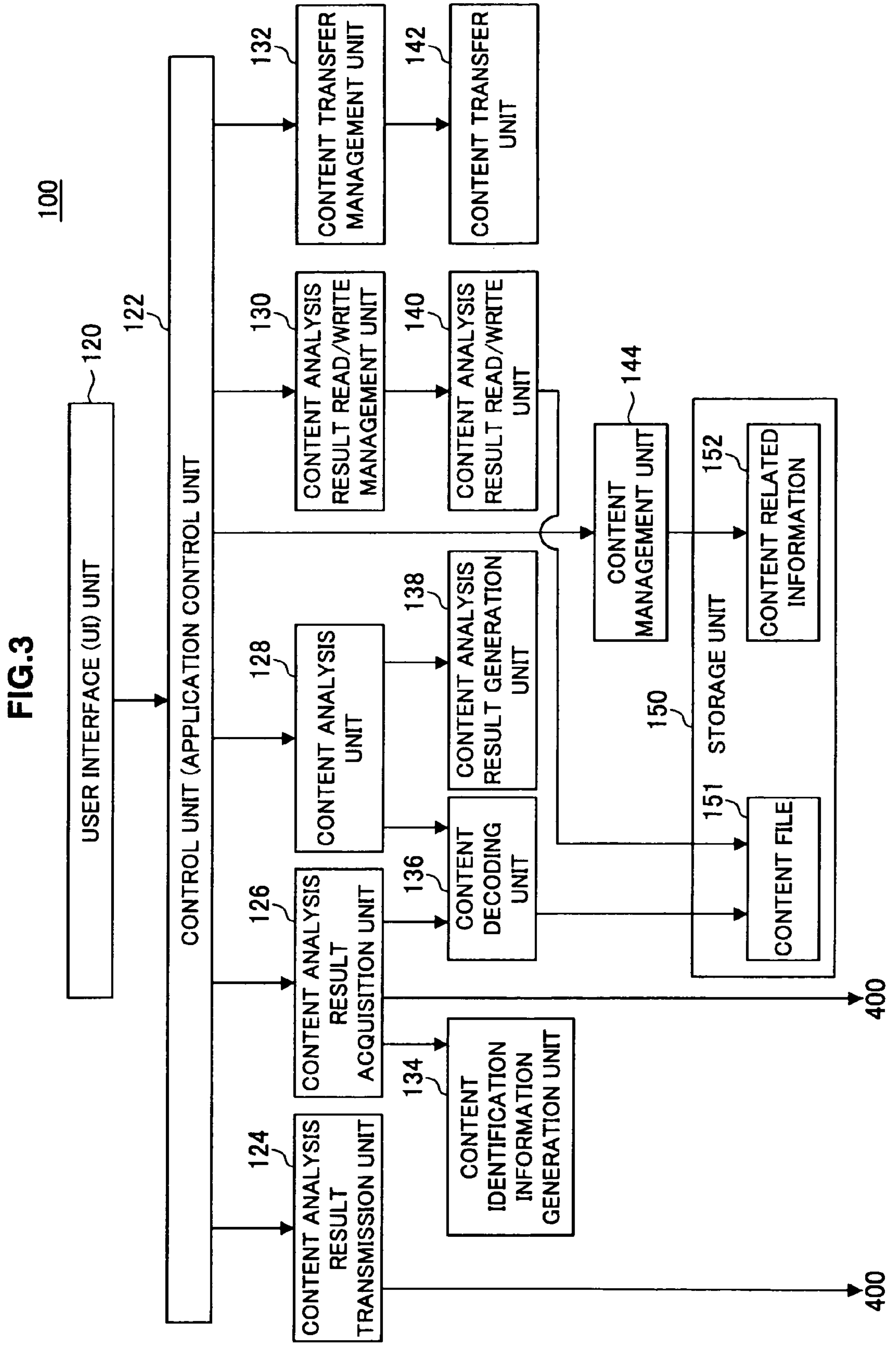
FIG. 3 is a diagram showing the function configuration of the information processing apparatus according to the first embodiment of the present invention.

FIG. 3 is a diagram showing the function configuration of the information processing apparatus 100 according to the first embodiment of the present invention. The function configuration of the information processing apparatus 100 according to the first embodiment of the present invention will be described below using FIG. 3.

As shown in FIG. 3, the information processing apparatus 100 according to the first embodiment of the present invention includes a user interface (UI) unit 120, a control unit (application control unit) 122, a content analysis result transmission unit 124, a content analysis result acquisition unit 126, a content analysis unit 128, a content analysis result generation unit 138, and a storage unit 150.

The user interface (UI) unit 120 is used to display album names, content names (such as work names), or moving images stored in the information processing apparatus 100, or album names, content names, or moving images stored in the mobile terminal 300 in the display unit 112. The user interface (UI) unit 120 reproduces content selected by the user from a list displayed in the display unit 112 according to instructions of the user, transfers the content to the mobile terminal 300, or receives content transferred from the mobile terminal 300. If, when content is reproduced, an analysis result thereof is held, the content can be reproduced by using the analysis result. Also, a content analysis is performed, content analysis results are transferred to the mobile terminal 300, or content analysis results transferred from the mobile terminal 300 are received according to instructions of the user. Display content displayed in the display unit 112 by the UI unit 120 will be described later.

The control unit 122 receives operation content of the user for a screen displayed in the display unit 112 by the UI unit 120 to control overall operations of a jukebox program. The control unit 122 causes the content analysis result acquisition unit 126 to perform processing to acquire and transmit content identification information stored in the storage unit 150 to the information providing apparatus 200 (another apparatus). Then, the control unit 122 determines whether the content analysis result acquisition unit 126 has received content analysis results from the information providing apparatus 200.

If the control unit 122 determines that the content analysis result acquisition unit 126 has received content analysis results from the information providing apparatus 200, the control unit 122 causes the storage unit 150 to store the received content analysis results by associating with content data stored in the storage unit 150. Content data is present in a content file 151 and the configuration of the content file 151 will be described later. If the control unit 122 determines that the content analysis result acquisition unit 126 has not received content analysis results from the information providing apparatus 200, the control unit 122 causes the content analysis unit 128 to perform processing to analyze content data stored in the storage unit 150 to obtain content analysis results. Then, the control unit 122 causes the storage unit 150 to store the content analysis results obtained by the content analysis unit 128 by associating with content data stored in the storage unit 150. Also, the control unit 122 causes the content analysis result transmission unit 124 to perform processing to transmit the content analysis results obtained by the content analysis unit 128 to the information providing apparatus 200.

If the information processing apparatus 100 is provided with a content identification information generation unit 134, the control unit 122 determines content data from the content name selected by the user. Then, the control unit 122 may cause the content identification information generation unit 134 to generate content identification information based on the determined content data.

If the information processing apparatus 100 is further provided with a content decoding unit 136, the control unit 122 determines content data from the content name. Then, the control unit 122 may cause the content decoding unit 136 to decode the determined content data to generate PCM data and to cause the content identification information generation unit 134 to generate content identification information based on the generated PCM data.

If the information processing apparatus 100 is further provided with a content analysis result read/write management unit 130, the control unit 122 may cause the content analysis result read/write management unit 130 to perform processing to write content analysis results into the content file 151 stored in the storage unit 150. The control unit 122 may also cause the content analysis result read/write management unit 130 to perform processing to read content analysis results from the content file 151 stored in the storage unit 150.

If the information processing apparatus 100 is further provided with a content transfer management unit 132, the control unit 122 may cause the content transfer management unit 132 to transfer content data or content analysis results stored in the storage unit 150 to the mobile terminal 300.

If the information processing apparatus 100 is further provided with a content management unit 144, the control unit 122 may cause the content management unit 144 to perform processing to acquire a content file name from content related information 152.

The content analysis result transmission unit 124 can transmit content analysis results obtained based on analysis by the content analysis unit 128 to the information providing apparatus 200 (another apparatus).

The content analysis result acquisition unit 126 acquires content identification information stored in the storage unit 150 and transmits the content identification information to the information providing apparatus 200 (another apparatus). Then, if the information providing apparatus 200 holds content analysis results, which are results of analyzing content data corresponding to the content identification information stored in the storage unit 150, the content analysis result acquisition unit 126 can receive the content analysis results from the information providing apparatus 200.

The information processing apparatus 100 may be provided with the content identification information generation unit 134. The content identification information generation unit 134 is used to generate content identification information from content data or PCM data. The content identification information generation unit 134 generates content identification information based on, for example, partial content data corresponding from the head to a predetermined position (for example, 15 sec from the head) of content data. If, for example, the content data is audio data, the content identification information generation unit 134 generates content identification information analyzes waveforms of partial data corresponding from the head to a predetermined position of the audio data to generate audio data identification information enabling identification of audio data as an analysis result. While the content identification information generation unit 134 is invoked by the content analysis result acquisition unit 126, functions held by the content identification information generation unit 134 may be held by the content analysis result acquisition unit 126.

The information processing apparatus 100 may be provided with the content decoding unit 136. The content decoding unit 136 is used to decode content data to acquire PCM data. While the content decoding unit 136 is invoked by the content analysis result acquisition unit 126 or the content analysis unit 128, functions held by the content decoding unit 136 may be held by each of the content analysis result acquisition unit 126 and the content analysis unit 128.

The content analysis unit 128 can obtain content analysis results by analyzing content data stored in the storage unit 150. If the information processing apparatus 100 is provided with the content analysis result generation unit 138, the content analysis unit 128 may cause the content analysis result generation unit 138 to perform processing to acquire content analysis results by analyzing content data. If the information processing apparatus 100 is further provided with the content decoding unit 136, the content analysis unit 128 determines content data from the content name. Then, the content analysis unit 128 may cause the content decoding unit 136 to decode the determined content data to generate PCM data and to acquire content analysis results by analyzing the generated PCM data.

The information processing apparatus 100 may be provided with the content analysis result generation unit 138. The content analysis result generation unit 138 can acquire content analysis results by analyzing content data. While the content analysis result generation unit 138 is invoked by the content analysis unit 128, functions held by the content analysis result generation unit 138 may be held by the content analysis unit 128.

The information processing apparatus 100 may be provided with the content analysis result read/write management unit 130. The content analysis result read/write management unit 130 is used to read/write content analysis results from/to any one of the content files 151. While the content analysis result read/write management unit 130 is invoked by the control unit 122, functions held by the content analysis result read/write management unit 130 may be held by the control unit 122.

The information processing apparatus 100 may be provided with a content analysis result read/write unit 140. The content analysis result read/write unit 140 is a plug-in module that reads content analysis results from the content file 151 and writes content analysis results to the content file 151. The content analysis result read/write unit 140 is present for each format of the content file 151. While the content analysis result read/write unit 140 is invoked by the content analysis result read/write management unit 130, functions held the content analysis result read/write unit 140 may be held by the content analysis result read/write management unit 130 or the control unit 122.

The information processing apparatus 100 may be provided with the content transfer management unit 132. The content transfer management unit 132 is used to manage processing to transfer content data or content analysis results held by the storage unit 150 to the mobile terminal 300 and processing to receive content data or content analysis results transferred from the mobile terminal 300. While the content transfer management unit 132 is invoked by the control unit 122, functions held by the content transfer management unit 132 may be held by the control unit 122.

The information processing apparatus 100 may be provided with a content transfer unit 142. The content transfer unit 142 is a plug-in module that transfers content data or content analysis results to the mobile terminal 300 and receives content data or content analysis results from the mobile terminal 300. The content transfer unit 142 is present for each model of the mobile terminal 300. While the content transfer unit 142 is invoked by the content transfer management unit 132, functions held by the content transfer unit 142 may be held by the content transfer management unit 132 or the control unit 122.

The information processing apparatus 100 may be provided with the content management unit 144. The content management unit 144 is used to manage the content related information 152 and can acquire the file name of content data from the content related information 152 to return the file name to the control unit 122. While the content management unit 144 is invoked by the control unit 122, functions held by the content management unit 144 may be held by the control unit 122.

The storage unit 150 is used to store the content file 151, the content related information 152 and the like. The content file 151 contains content data and metadata thereof. The content file 151 will be described later. The content related information 152 contains data related to content data. Data stored in the content related information 152 is associated with the content file 151. The content file 151 is a generic name of file in which content such as music and video is recorded and is stored, for example, in the HDD 116. The content related information 152 will be described later.

Figure 4:
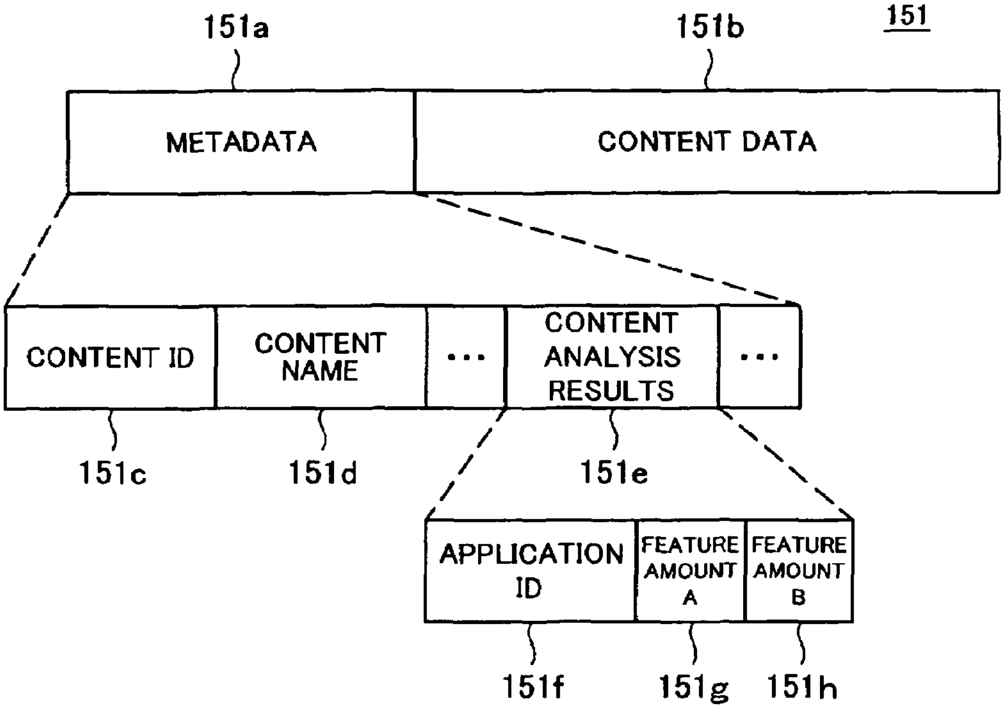
FIG. 4 is a diagram exemplifying the structure of a content file according to the first embodiment of the present invention.

FIG. 4 is a diagram exemplifying the structure of the content file 151 according to the first embodiment of the present invention, and FIG. 5 is a diagram exemplifying the structure of the content related information 152 according to the first embodiment of the present invention.

As shown in FIG. 4, the content file 151 includes metadata 151*a* and content data 151*b*. The content data 151*b* is content data such as audio data, moving image data, still image data, and text data. The metadata 151*a* is data related to the content data 151*b*.

The metadata 151*a* includes a content ID 151*c*, a content name 151*d*, and content analysis results 151*e*. The content ID 151*c* is data to uniquely determine the content data 151*b*. The content name 151*d* is the name of the content data 151*b*. The content analysis results 151*e* are analysis results obtained by analyzing the content data 151*b* and includes an application ID 151*f*, a feature amount A 151*g*, and a feature amount B 151*h*.

The application ID 151*f* is identification information that can uniquely determine the application that has generated the feature amount A 151*g*, the feature amount B 151*h* and the like contained in the content analysis results 151*e*. Accordingly, whether the feature amount A 151*g*, the feature amount B 151*h* and the like contained in the content analysis results 151*e* are generated by the information processing apparatus 100 or the mobile terminal 300 can be determined. Generally, results of content analysis performed by the information processing apparatus 100 are may be more precise than those of content analysis performed by the mobile terminal 300.

The feature amount A 151*g* and the feature amount B 151*h* are examples of data obtained as a result of analyzing the content data 151*b*. If the content data 151*b* is audio data, the feature amount A 151*g* and the feature amount B 151*h* are information about the pitch of sound, tempo, length of sound and the like and, if the content data 151*b* is moving image data, still image data or the like, the feature amount A 151*g* and the feature amount B 151*h* are information about luminance of each pixel, brightness and the like. Here, the metadata 151*a* is assumed to have two feature amounts (the feature amount A 151*g* and the feature amount B 151*h*), but the number of feature amounts is not specifically limited if at least one feature amount is contained.

As shown in FIG. 5, the content related information 152 includes a management ID 152*a*, a content name 152*b*, a package name 152*c*, a track number 152*d*, a content file name 152*e*, a content ID 152*f*, and content analysis result embedded information 152*g*.

The management ID 152*a* is information that can uniquely determine the content data 151*b* to manage the content data 151*b*. The content name 152*b* is the name of the content data 151*b*. The package name 152*c* is the name of the package in which the content data 151*b* is contained. If the content data 151*b* is music data, an album name or the like corresponds to the package name 152*c*. The track number 152*d* is the track number in an album to which the package name 152*c* is attached and if the content data 151*b* is recorded in a CD, the track number in the CD corresponds to the track number 152*d*. The track number 152*d* is a number beginning with 1 and the number is successively assigned in units of package. The content file name 152*e* describes the location where the file (the content file 151) of the content data 151*b* is stored using a full path. The content ID 152*f* is identification information uniquely attached to the content data 151*b*.

The content analysis result embedded information 152*g* is information indicating whether the content analysis results 151*e*, which are results of analyzing the content data 151*b*, are embedded in the content file 151. For example, "1" is set as a value indicating that the content analysis results 151*e* are embedded and "0" as a value indicating that the content analysis results 151*e* are not embedded.

In the foregoing, the function configuration of the information processing apparatus 100 according to an embodiment of the present invention has been described. Next, the configuration of the information providing apparatus 200 according to an embodiment of the present invention will be described.

[Hardware Configuration of the Information Providing Apparatus]

Figure 6:
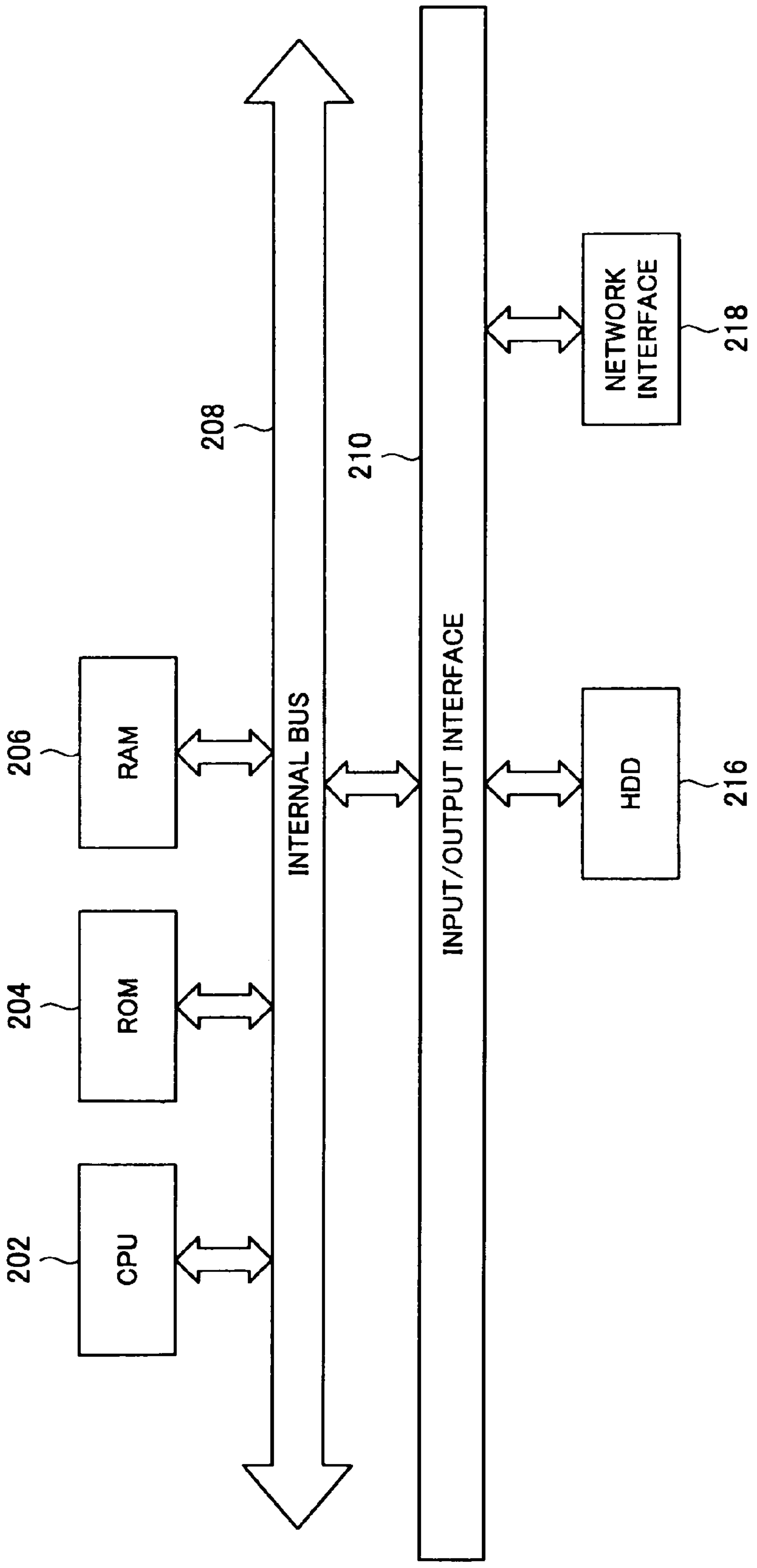
FIG. 6 is an explanatory view illustrating the configuration of a mobile terminal according to the first embodiment of the present invention.

FIG. 6 is a diagram showing the hardware configuration of the information providing apparatus 200 according to the first embodiment of the present invention. The hardware configuration of the information providing apparatus 200 according to the first embodiment of the present invention will be described using FIG. 6.

As shown in FIG. 6, the information providing apparatus 200 according to the first embodiment of the present invention includes a CPU 202, a ROM 204, a RAM 206, an internal bus 208, an input/output interface 210, an HDD 216, and a network interface 218.

Here, the CPU 202, the ROM 204, the RAM 206, the internal bus 208, the input/output interface 210, the HDD 216, and the network interface 218 have functions similar to those of the CPU 102, the ROM 104, the RAM 106, the internal bus 108, the input/output interface 110, the HDD 116, and the network interface 118 in the information processing apparatus 100 shown in FIG. 2 and thus, a description thereof is omitted. In view of processing performed in response to a request from a plurality of the information processing apparatuses 100, these components in the information providing apparatus 200 may have higher performance than those in the information processing apparatuses 100 in terms of functionality.

In the foregoing, the configuration of the information providing apparatus 200 according to an embodiment of the present invention has been described. Next, the function configuration of the information providing apparatus 200 according to an embodiment of the present invention will be described.

[Function Configuration of the Information Providing Apparatus]

Figure 7:
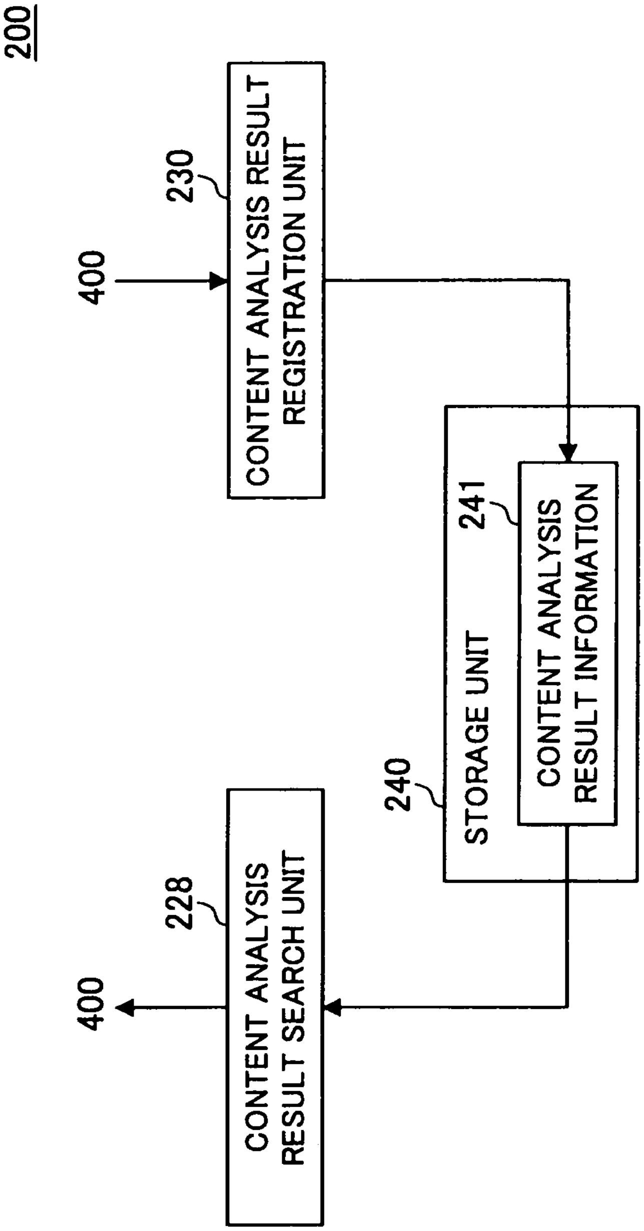
FIG. 7 is a diagram showing the function configuration of the information providing apparatus according to the first embodiment of the present invention.

FIG. 7 is a diagram showing the function configuration of the information providing apparatus 200 according to the first embodiment of the present invention. The function configuration of the information providing apparatus 200 according to the first embodiment of the present invention will be described using FIG. 7.

As shown in FIG. 7, the information providing apparatus 200 according to the first embodiment of the present invention includes a content analysis result search unit 228, a content analysis result registration unit 230, and a storage unit 240.

When content identification information is received from the information processing apparatus 100 (another apparatus), the content analysis result search unit 228 determines whether any content analysis result corresponding to the received content identification information is stored in the storage unit 240. If the content analysis result search unit 228 determines that a content analysis result is stored in the storage unit 240, the content analysis result search unit 228 acquires and transmits the content analysis result to the information processing apparatus 100.

If the content analysis result search unit 228 does not transmit any content analysis result, the content analysis result registration unit 230 receives a content analysis result from the information processing apparatus 100. The content analysis result registration unit 230 causes the storage unit 240 to store the received content analysis result by associating with the content identification information received by the content analysis result search unit 228. The stored information by being associated is added to content analysis result information 241 of the storage unit 240.

The storage unit 240 can associate and store content identification information corresponding to content data and a content analysis result, which is a result of analyzing the content data, as the content analysis result information 241.

In the foregoing, the function configuration of the information providing apparatus 200 according to an embodiment of the present invention has been described. Next, the configuration of the mobile terminal 300 according to an embodiment of the present invention will be described.

[Hardware Configuration of the Mobile Terminal]

Figure 8:
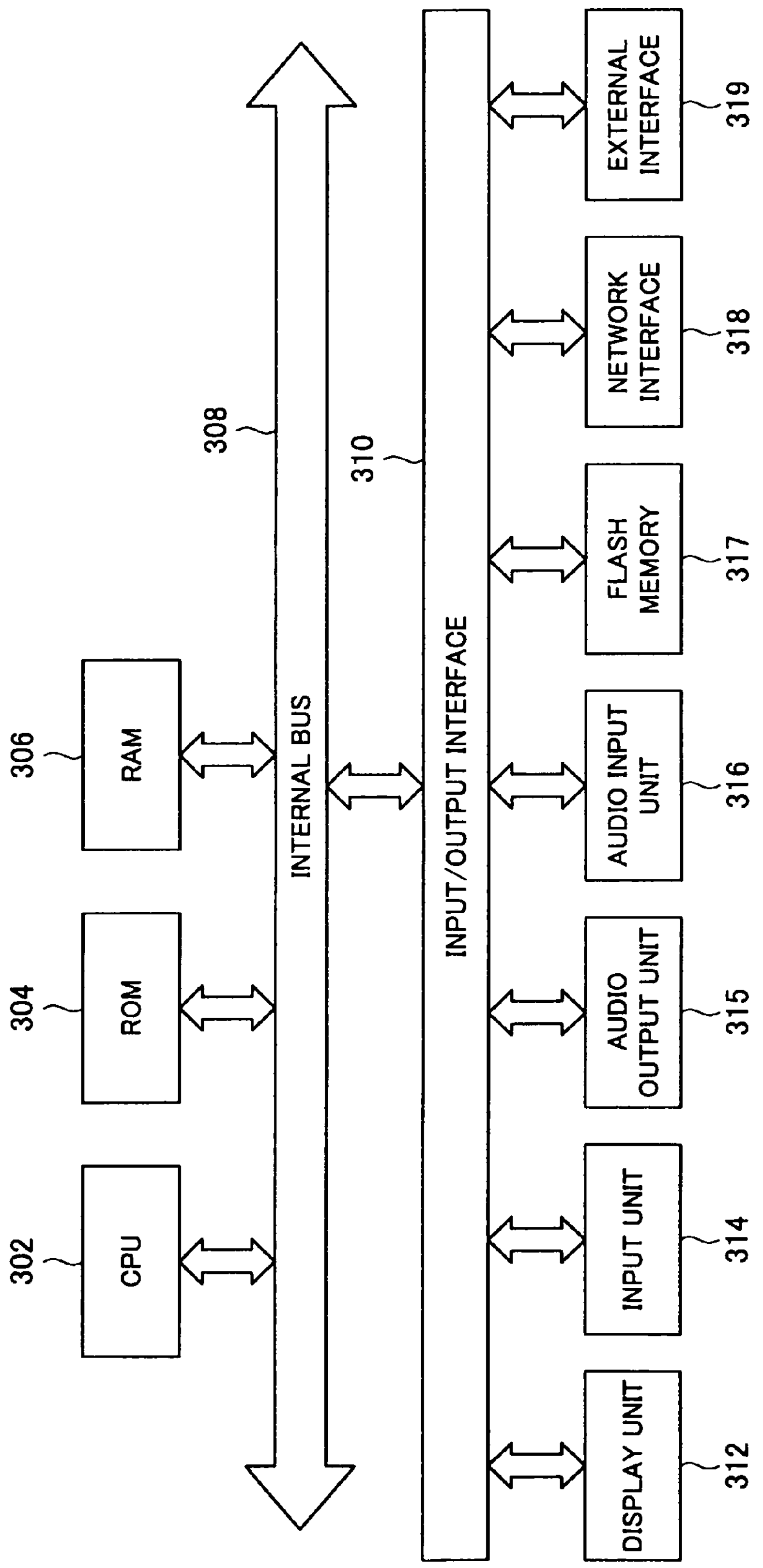
FIG. 8 is a diagram showing the hardware configuration of a mobile terminal according to the first embodiment of the present invention.

FIG. 8 is a diagram showing the hardware configuration of the mobile terminal 300 according to the first embodiment of the present invention. The hardware configuration of the mobile terminal 300 according to the first embodiment of the present invention will be described using FIG. 8.

FIG. 8 is an explanatory view illustrating the configuration of the mobile terminal 300 according to an embodiment of the present invention. The configuration of the mobile terminal 300 according to the first embodiment of the present invention will be described using FIG. 8.

As shown in FIG. 8, the mobile terminal 300 according to the first embodiment of the present invention includes a CPU 302, a ROM 304, a RAM 306, an internal bus 308, an input/output interface 310, a display unit 312, an input unit 314, an audio output unit 315, an audio input unit 316, a flash memory 317, a network interface 318, and an external interface 319.

Here, the CPU 302, the ROM 304, the RAM 306, the internal bus 308, the input/output interface 310, the display unit 312, the input unit 314, the audio output unit 315, the audio input unit 316, the network interface 318, and the external interface 319 have functions similar to the CPU 102, the ROM 104, the RAM 106, the internal bus 108, the input/output interface 110, the display unit 112, the input unit 114, the audio output unit 115, the network interface 118, and the external interface 119 in the information processing apparatus 100 shown in FIG. 2 and thus, a description thereof is omitted. In view of being carried and used, these components in the mobile terminal 300 may have limitations in functionality when compared with those in the information processing apparatus 100.

The flash memory 317 is a rewritable memory and, in contrast to the RAM 306, a nonvolatile memory in which data is not deleted after power being turned off. Therefore, the flash memory 317 is suitable for storage of data of the telephone directory, mails received by the mobile terminal 300, and content downloaded via a communication network or transferred from the information processing apparatus 100.

Though not shown in FIG. 8, the mobile terminal 300 may be provided with a slot into which a small recording medium such as a memory stick (trademark) can be inserted. By inserting a small recording medium into the slot, content can be stored, in addition to the flash memory 317.

In the foregoing, the hardware configuration of the mobile terminal 300 according to an embodiment of the present invention has been described. Next, the function configuration of the mobile terminal 300 according to an embodiment of the present invention will be described.

[Function Configuration of the Mobile Terminal]

Figure 9:
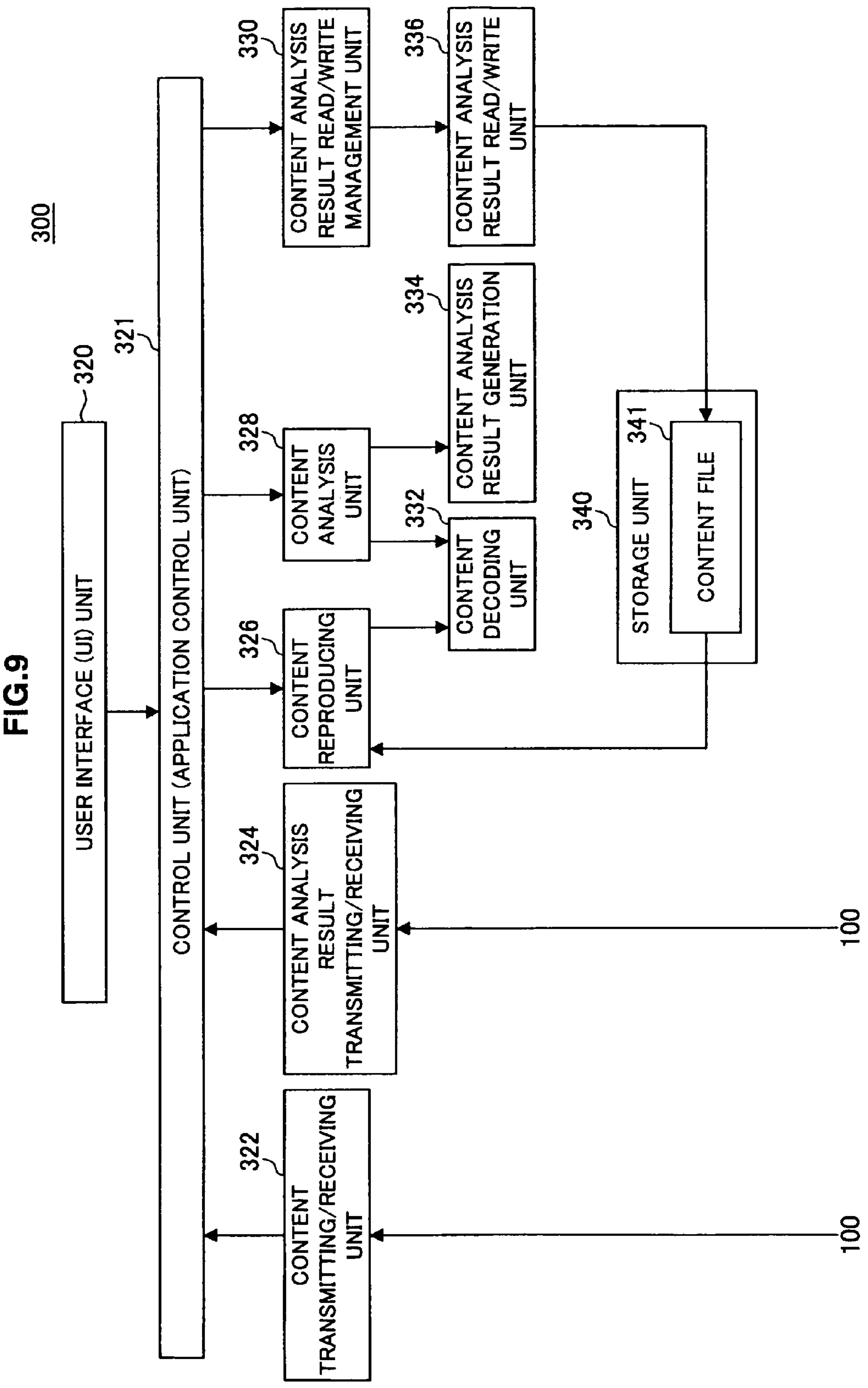
FIG. 9 is a diagram showing the function configuration of the mobile terminal according to the first embodiment of the present invention.

FIG. 9 is a diagram showing the function configuration of the mobile terminal 300 according to the first embodiment of the present invention. The function configuration of the mobile terminal 300 according to the first embodiment of the present invention will be described using FIG. 9.

As shown in FIG. 9, the mobile terminal 300 according to the first embodiment of the present invention includes a UI unit 320, a control unit (application control unit) 321, a content transmitting/receiving unit 322, a content analysis result transmitting/receiving unit 324, a content reproducing unit 326, a content analysis unit 328, and a content analysis result read/write management unit 330. The mobile terminal 300 also includes a content decoding unit 332, a content analysis result generation unit 334, a content analysis result read/write unit 336, and a storage unit 340.

The UI unit 320 is used to reproduce content selected by the user from a list displayed in the display unit 312 by the UI unit 320, to transfer content to the information processing apparatus 100, or to receive content transferred from the information processing apparatus 100. If, when content is reproduced, an analysis result of the content is held, the content can be reproduced while the analysis result is used. Moreover, a content analysis is performed, content analysis results are transferred to the information processing apparatus 100, or content analysis results transferred from the information processing apparatus 100 are received according to user instructions. Display content displayed in the display unit 312 by the UI unit 320 will be described later.

The control unit 321 is used to receive operation content by the user for the screen displayed in the display unit 312 by the UI unit 320 to control overall operations of the mobile terminal 300.

The content transmitting/receiving unit 322 is used, when content data transferred from the information processing apparatus 100 is received, to cause the storage unit 340 to store the content data via the control unit 321. Also, when a command to transmit content data according to user instructions is received via the control unit 321, the content transmitting/receiving unit 322 transmits the content data to the information processing apparatus 100.

When a content analysis result transferred from the information processing apparatus 100 is received, the content analysis result transmitting/receiving unit 324 is used to cause the storage unit 340 to store the content analysis result via the control unit 321. Also, when a command to transmit a content analysis result according to user instructions is received via the control unit 321, the content analysis result transmitting/receiving unit 324 transmits the content analysis result to the information processing apparatus 100.

When a command to reproduce content data according to user instructions is received via the control unit 321, if a content analysis result is attached to the content data stored in the storage unit 340, the content reproducing unit 326 can reproduce the content data while using the content analysis result.

The content analysis unit 328, the content analysis result read/write management unit 330, the content decoding unit 332, the content analysis result generation unit 334, and the content analysis result read/write unit 336 have functions similar to those of the content analysis unit 128, the content analysis result read/write management unit 130, the content decoding unit 136, the content analysis result generation unit 138, and the content analysis result read/write unit 140 in the information processing apparatus 100 shown in FIG. 3 and thus, a description thereof is omitted. In view of being carried and used, these components in the mobile terminal 300 may have limitations in functionality when compared with those in the information processing apparatus 100.

The storage unit 340 is used to store a content file 341 or the like. The content file 341 contains content data and metadata thereof. The structure of the content file 341 is similar to that of the content file 151 shown in FIG. 4 and therefore, a detailed description thereof is omitted.

In the foregoing, the function configuration of the mobile terminal 300 according to an embodiment of the present invention has been described. Next, screens displayed in the information processing apparatus 100 according to an embodiment of the present invention will be described.

[Screen Examples Displayed in the Display Unit of the Information Processing Apparatus 100]

FIG. 10 to FIG. 15 are explanatory views exemplifying the screen displayed in the display unit 112 of the information processing apparatus 100 according to the first embodiment of the present invention. Screens displayed in the information processing apparatus 100 according to the first embodiment of the present invention will be described below using FIG. 10 to FIG. 15. Screen examples described below are screen examples displayed when music data is used as an example of content data, but the content data is not limited to music data.

Figure 10:
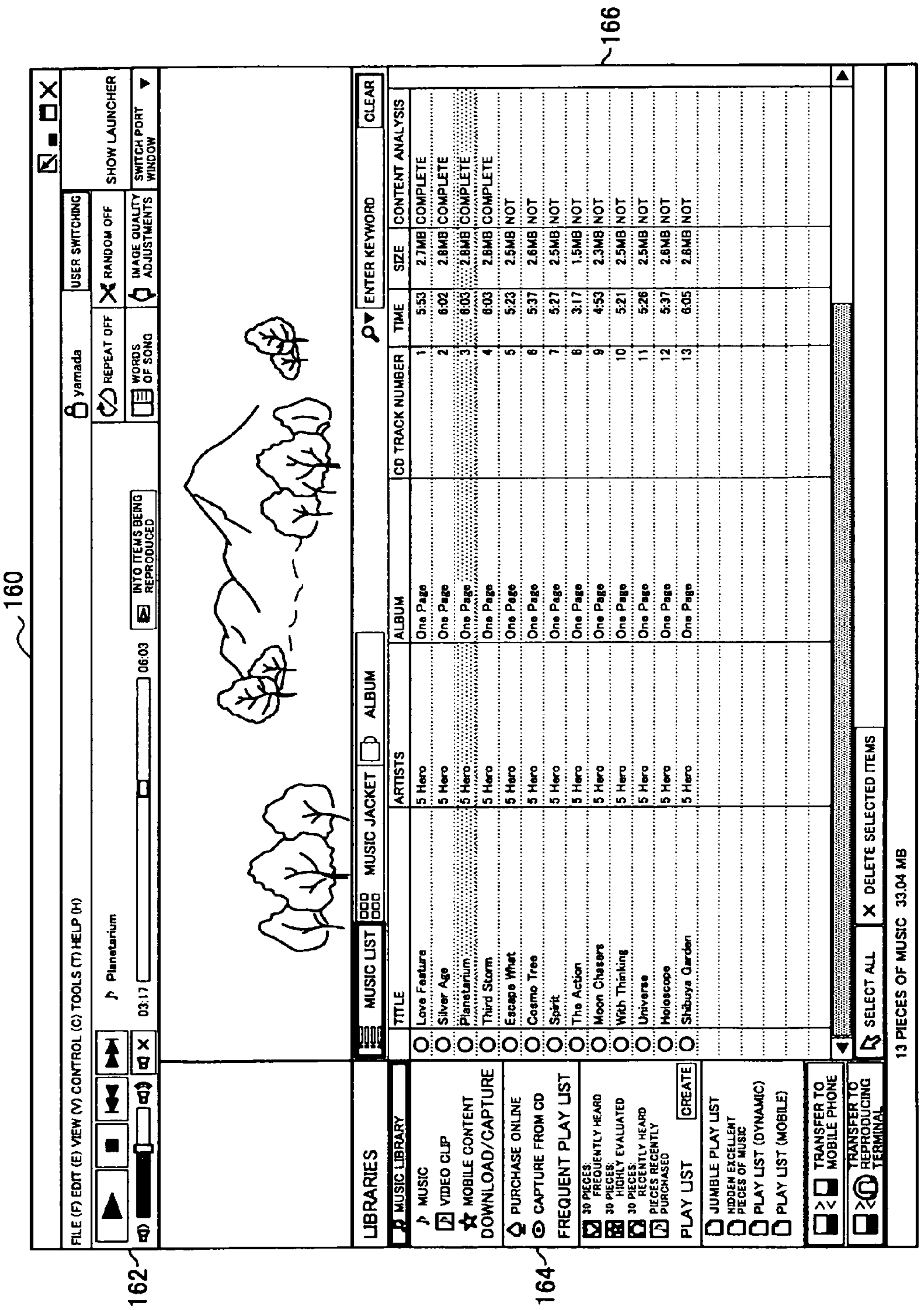
FIG. 10 is an explanatory view exemplifying the screen displayed in a display unit of the information processing apparatus according to the first embodiment of the present invention.

FIG. 10 shows a screen displayed in the display unit 112 when a jukebox program 160 according to the first embodiment of the present invention is executed in the information processing apparatus 100. The jukebox program 160 is stored, for example, in the HDD 116 and the program is executed by being loaded into the RAM 106 and the program loaded from the CPU 102 to the RAM 106 successively being executed. Information containing a content operation unit 162, a sidebar 164, and a PC content display unit 166 is displayed in the display unit 112 by the jukebox program 160 according to an embodiment of the present invention.

The content operation unit 162 is used to provide instructions of the reproduction, pause, or stop of content, volume adjustments of content being reproduced, adjustments of the reproduction location, skip of content, repeated reproduction, shuffle reproduction and the like to content displayed in the PC content display unit 166. The jacket of content being reproduced, images related to content being reproduced or the like may be displayed in the content operation unit 162.

The sidebar 164 is used to switch the content display to the PC content display unit 166 or to carry out an exchange of content between the information processing apparatus 100 and the mobile terminal 300. If, for example, “Music library” in “Libraries” is selected by a mouse click or the like in the sidebar 164, a list of content concerning music that can be reproduced by the information processing apparatus 100 is displayed in the PC content display unit 166. If “Music” under “Music library” is selected, music files encoded by the compression method such as MP3 (MPEG Audio Layer-3), AAC (Advanced Audio Coding), and ATRAC (Adaptive Transform Acoustic Coding) of content concerning music are extracted and displayed in the PC content display unit 166. It is also possible to make a selection from the sidebar 164 so that all content regardless of the type is listed.

The PC content display unit 166 is used to list content that can be reproduced by the information processing apparatus 100. A list of content displayed in the PC content display unit 166 is changed by an operation of the sidebar 164. Attribute information of content is displayed in list form in the PC content display unit 166 and attribute information of content may include, for example, the title of content, reproduction time of content, artist names of content, name of album in which content is contained, evaluations set by the user for content, size of content, registration date/time of content with the information processing apparatus 100, and genre of content. The above attribute information of content is stored inside the information processing apparatus 100, for example, in the HDD 116 in metadata form. Also, the content analysis is displayed as attribute information of content. “Complete” in the field of content analysis means that the content analysis for the applicable music data is already completed, and “Not” means that the content analysis for the applicable music data is not completed. “Complete” and “Not” in the field of content analysis correspond to “1 (embedded)” and “0 (not embedded)” set to the content analysis result embedded information 152*g* of the content related information 152 respectively.

Figure 11:
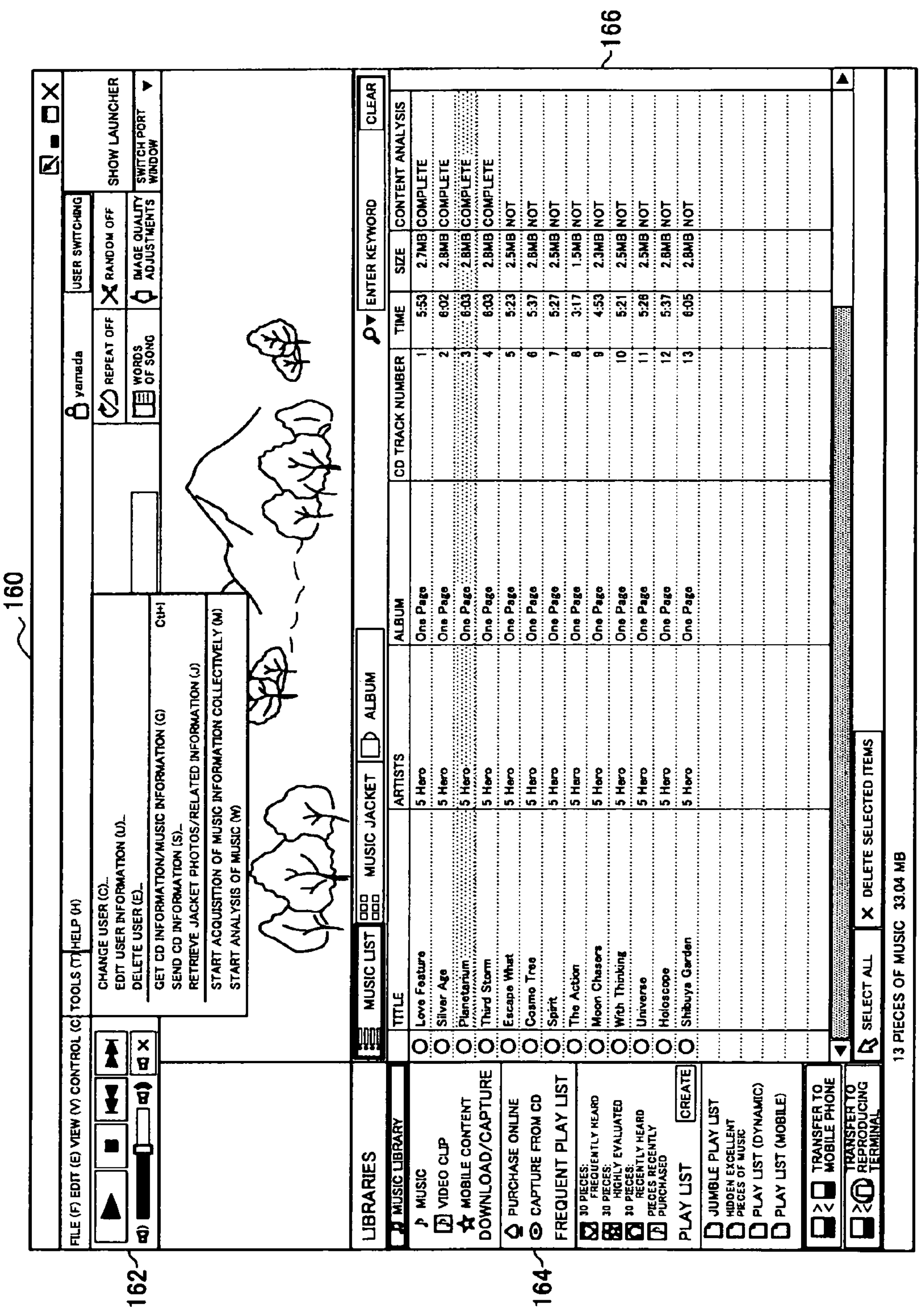
FIG. 11 is an explanatory view exemplifying the screen displayed in a display unit of the information processing apparatus according to the first embodiment of the present invention.

FIG. 11 shows an example of the screen when analysis of music data using the jukebox program is started. As shown in FIG. 11, if “Tools (T)” in the content operation unit 162 is selected by a mouse click or the like, processing including “Start music analysis (W)” is listed. If “Start music analysis (W)" is selected by a mouse click or the like, a popup window before starting music data analysis is displayed (see FIG. 12).

Figure 12:
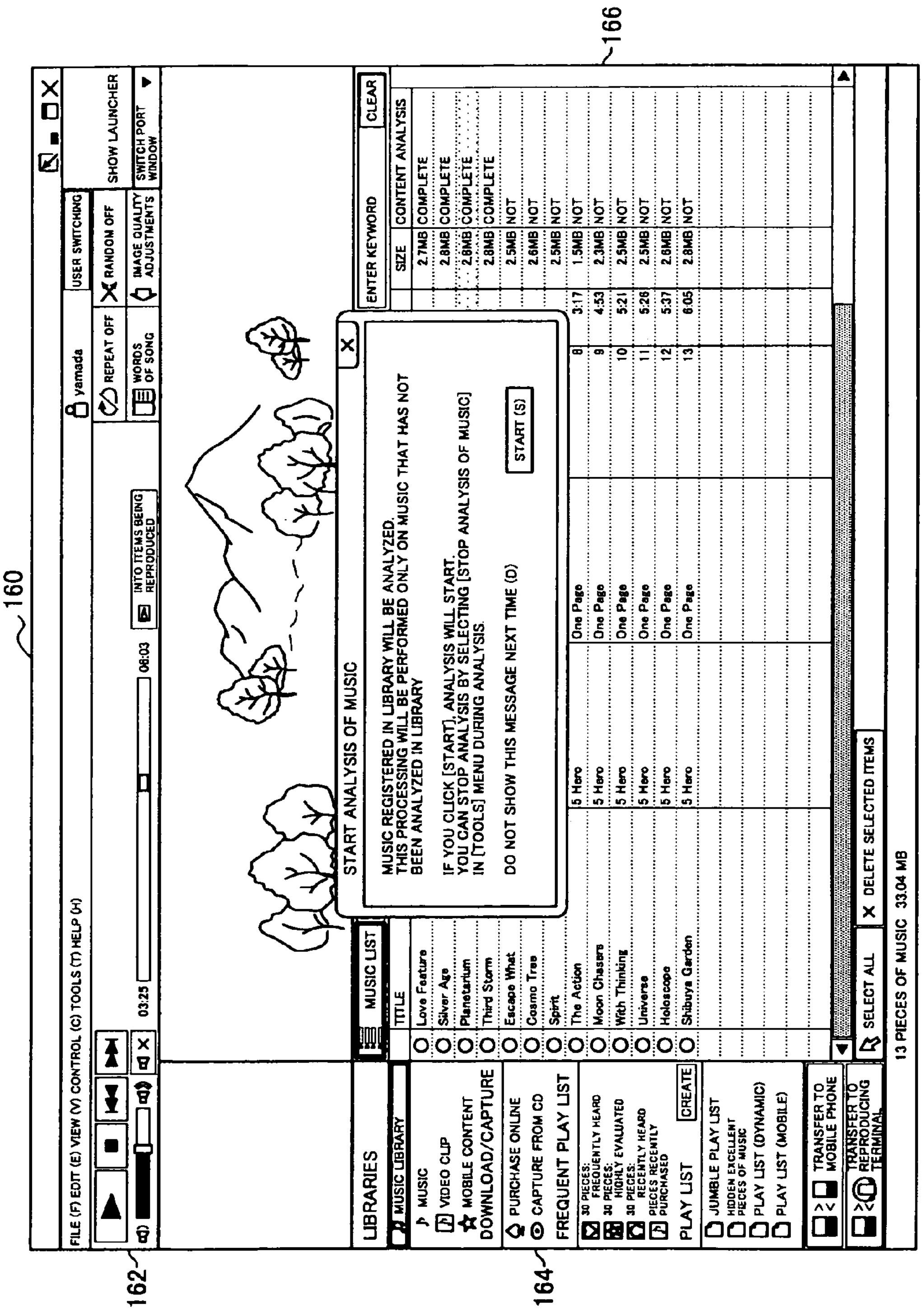
FIG. 12 is an explanatory view exemplifying the screen displayed in a display unit of the information processing apparatus according to the first embodiment of the present invention.

FIG. 12 shows an example of the screen in which a popup window is displayed when music data analysis is started. As shown in FIG. 12, a popup window is displayed before music data analysis is started. Here, a message that analysis processing will be performed only on music data that has not been analyzed is displayed. Music data that has not been analyzed is such data whose content analysis result embedded information 152*g* of the content related information 152 is "0 (not embedded)".

Figure 13:
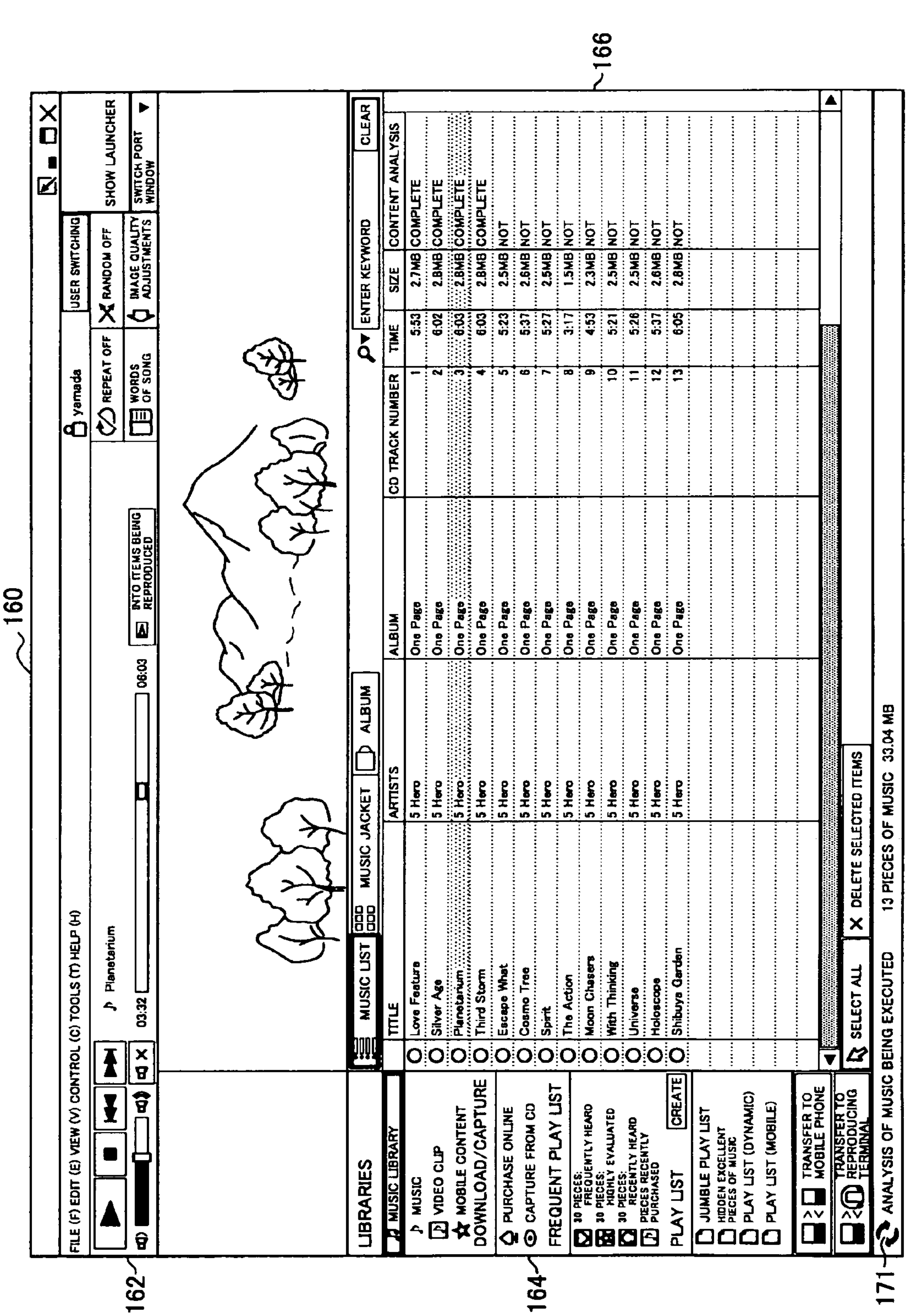
FIG. 13 is an explanatory view exemplifying the screen displayed in a display unit of the information processing apparatus according to the first embodiment of the present invention.

FIG. 13 shows an example of the screen displayed during analysis of music data. As shown in FIG. 13, a progress display icon 171 is displayed in the lower right corner of the screen.

Figure 14:
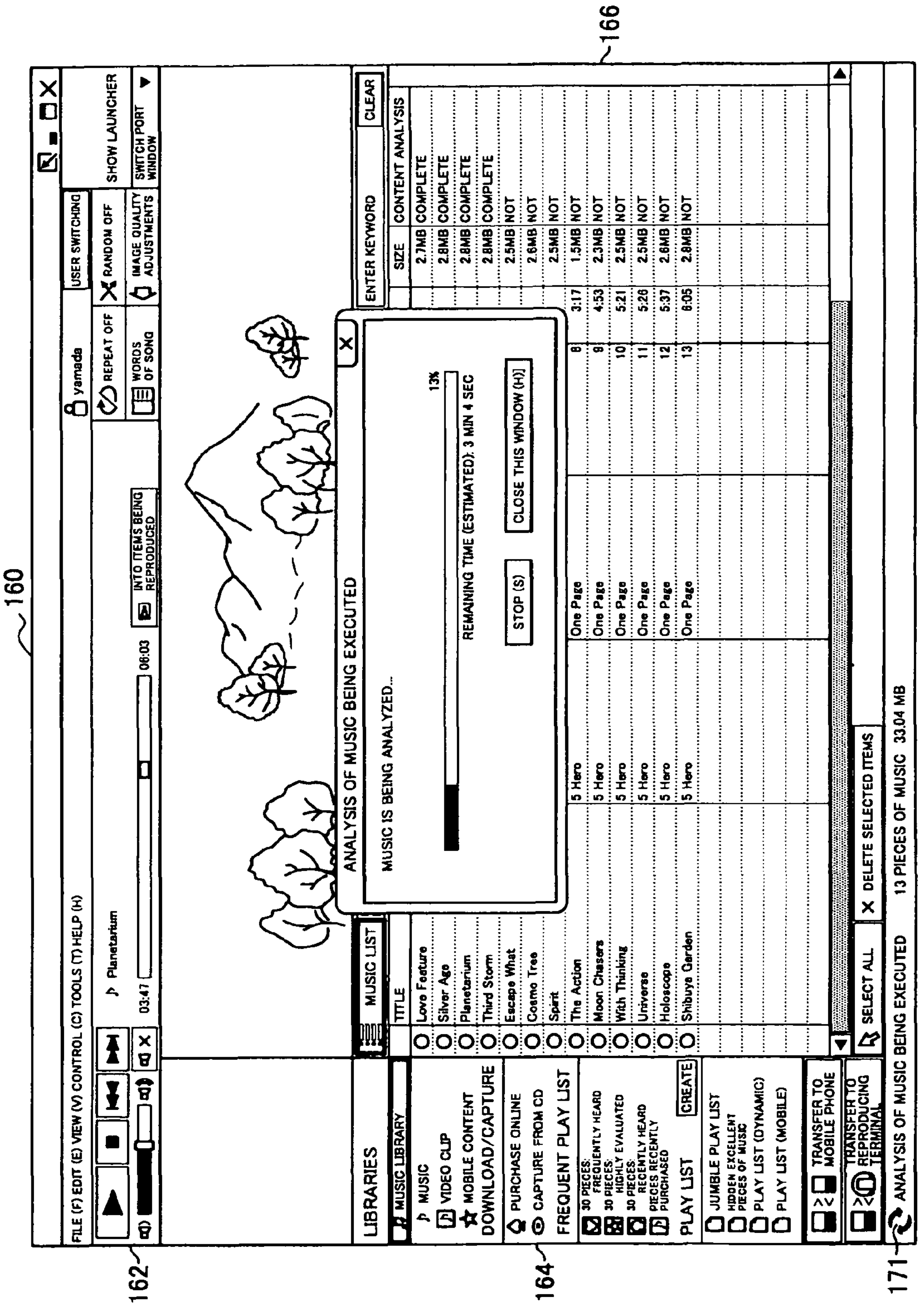
FIG. 14 is an explanatory view exemplifying the screen displayed in a display unit of the information processing apparatus according to the first embodiment of the present invention.

FIG. 14 shows an example of the screen in which a popup window showing progress of the music data analysis is displayed. If the progress display icon 171 is selected by a mouse click or the like, a screen in which a popup window showing progress of the music data analysis is displayed, as shown in FIG. 14, is displayed. Analysis of music data can be stopped by selecting the "Stop (S)" button by a mouse click or the like. When analysis of music data is completed, the applicable field of content analysis in the PC content display unit 166 changes from "Not" to "Complete".

Figure 15:
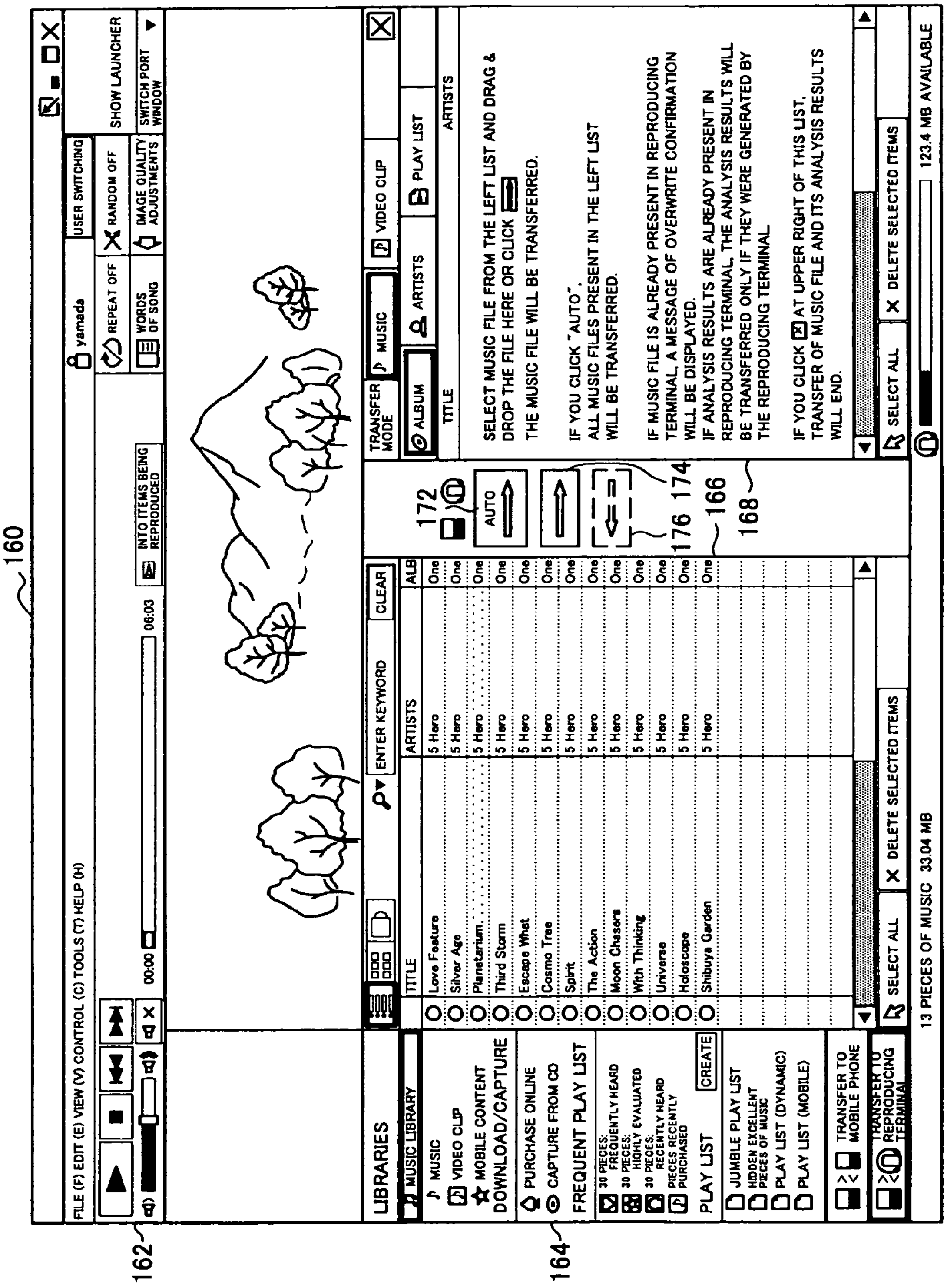
FIG. 15 is an explanatory view exemplifying the screen displayed in a display unit of the information processing apparatus according to the first embodiment of the present invention.

FIG. 15 shows an example of the screen to transfer music data whose music data analysis is completed. If "Transfer reproducing terminal" in the sidebar 164 is selected by a mouse click or the like, a screen as shown in FIG. 15 to transfer music data whose music data analysis is completed is displayed. If a transfer button 174 is selected by a mouse click or the like, a music file (the content file 151) of music data selected in the left list is transferred from the information processing apparatus 100 to the mobile terminal 300. If an auto transfer 172 is selected by a mouse click or the like, music files (the content files 151) present in the left list are all transferred to the mobile terminal 300. If a music file (the content file 151) is present in the mobile terminal 300, a message of overwrite confirmation may be made to be displayed. If analysis results are present in the mobile terminal 300, analysis results may be made to be transferred only if the analysis results have been generated by the mobile terminal 300. This is because results of analyzing content by the information processing apparatus 100 may generally be more precise than those of analyzing content by the mobile terminal 300. If a back-transfer button 176 is selected by a mouse click or the like, a music file (the content file 151) of music data selected in the right list can be transferred from the mobile terminal 300 to the information processing apparatus 100.

In the foregoing, screens displayed in the information processing apparatus 100 according to an embodiment of the present invention have been described. Next, screens displayed in the mobile terminal 300 according to an embodiment of the present invention will be described.

[Screen Examples Displayed in the Display Unit of the Mobile Terminal 300]

Figure 16A:
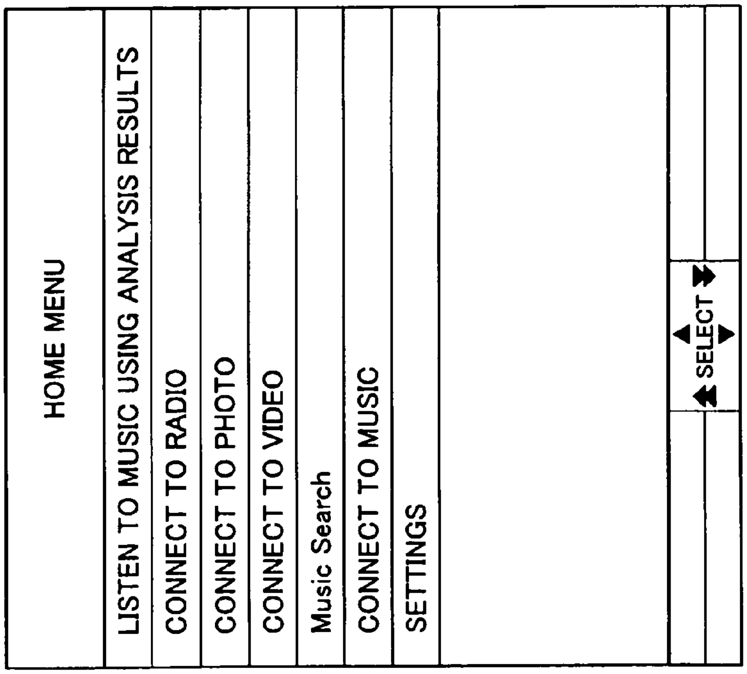
FIG. 16A is a diagram exemplifying the screen displayed in the display unit of the mobile terminal according to the first embodiment of the present invention.
Figure 16B:
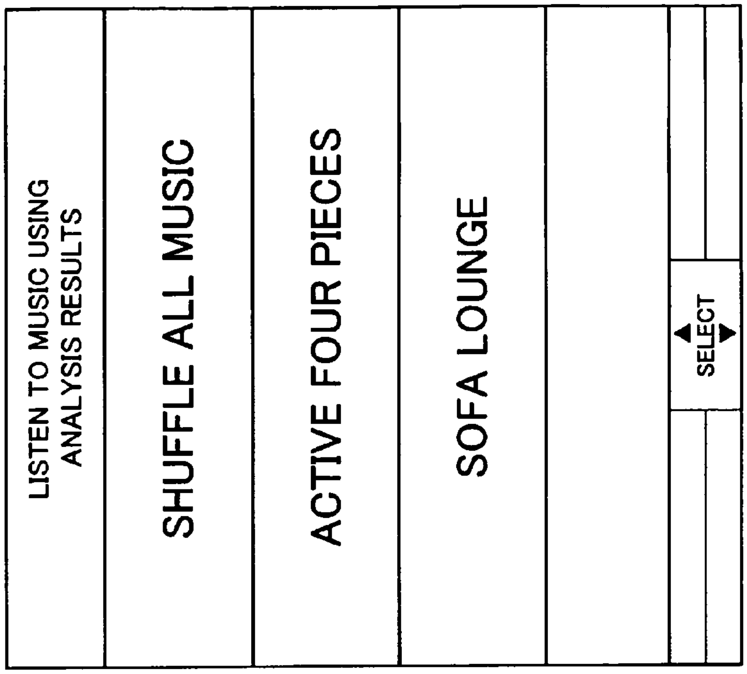
FIG. 16B is a diagram exemplifying the screen displayed in the display unit of the mobile terminal according to the first embodiment of the present invention.

FIG. 16A and FIG. 16B are diagrams exemplifying the screen displayed in the display unit 312 of the mobile terminal 300 according to the first embodiment of the present invention. Screens displayed in the mobile terminal 300 according to the first embodiment of the present invention will be described below using FIG. 16A and FIG. 16B. Screen examples described below are screen examples displayed when music data is used as an example of content data, but the content data is not limited to music data.

FIG. 16A is a diagram showing an example of the screen to make a selection to listen to music using content analysis results. If "Listen to music using analysis results" is selected by a mouse click or the like, an example of the screen, as shown in FIG. 16B, to select sections obtained by classifying music based on content analysis results is displayed. In FIG. 16B, "Shuffle all", "Active", and "Sofa lounge" are displayed as section examples.

In the foregoing, screens displayed in the mobile terminal 300 according to the first embodiment of the present invention have been described. Next, an information processing method according to an embodiment of the present invention will be described.

[Flow of Processing by the Information Processing System 10]

Figure 17:
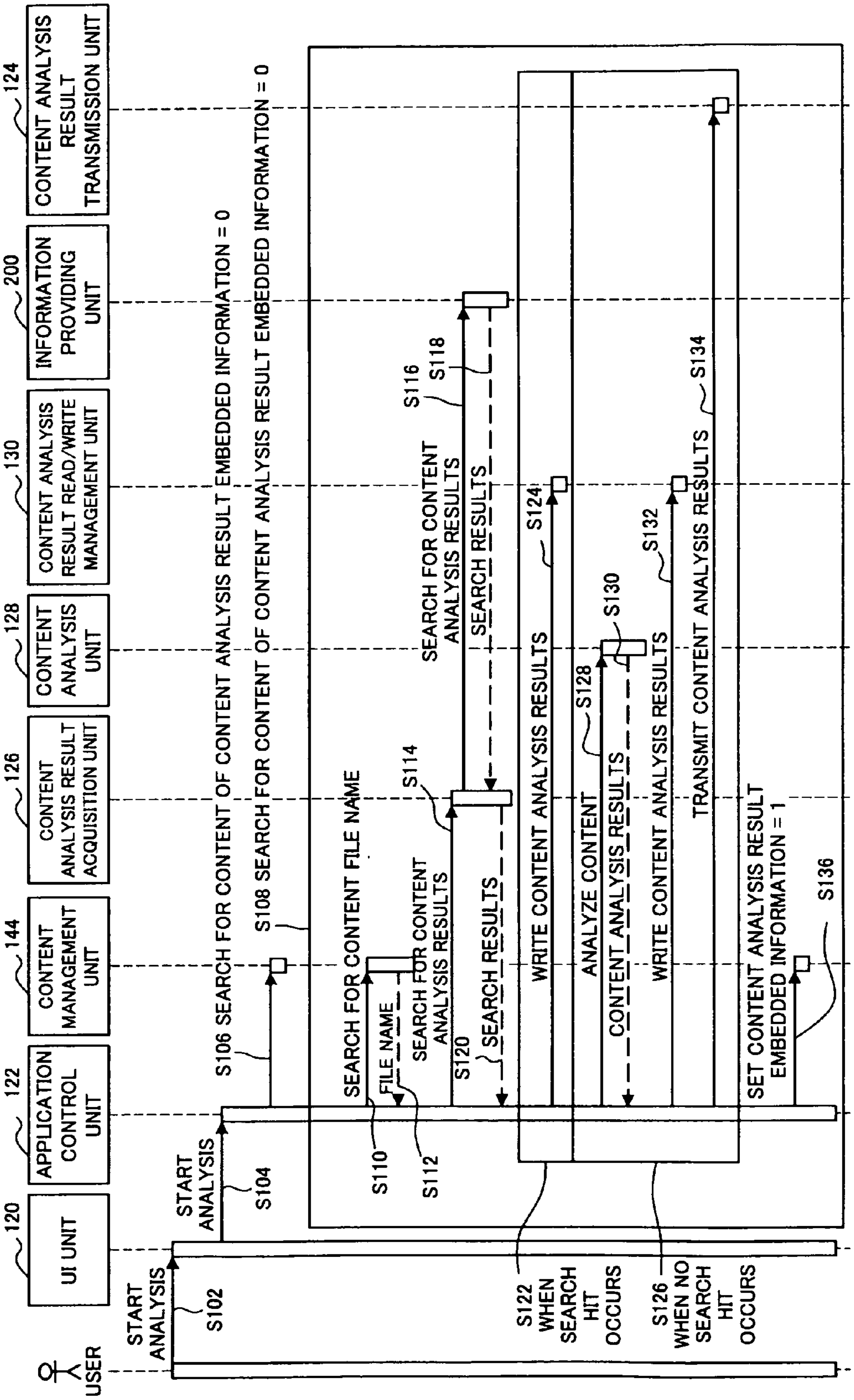
FIG. 17 is a flow chart illustrating an information processing method according to the first embodiment of the present invention.

FIG. 17 is a flow chart illustrating an information processing method according to the first embodiment of the present invention. The information processing method according to the first embodiment of the present invention will be described below using FIG. 17.

First, the user provides instructions to the UI unit 120 to start analysis of content (step S102). In the present embodiment, instructions to start analysis of content are provided by, for example, a mouse click "Start analysis of music" (see FIG. 11) displayed in the jukebox program.

When the user provides instructions to the UI unit 120 to start analysis of content, the UI unit 120 provides instructions to start analysis of content to the application control unit 122 (step S104). Further, the application control unit 122 that received the instructions provides instructions to the content management unit 144 to search for content of content analysis result embedded information=0 (not embedded) (step S106). The content management unit 144 returns, for example, content IDs of content of content analysis result embedded information=0 (not embedded) to the application control unit 122.

The application control unit 122 repeatedly performs processing within a rectangular frame on content of content analysis result embedded information=0 (not embedded) (step S108). In processing within the rectangular frame, the application control unit 122 first provides instructions to the content management unit 144 to search for content file names based on, for example, the content IDs returned from the content management unit 144 (step S110). The content management unit 144 returns content file names corresponding to the content IDs to the application control unit 122 (step S112). The application control unit 122 delivers the returned file names to the content analysis result acquisition unit 126 to provide instructions to search for content analysis results of content data determined by the file names to the content analysis result acquisition unit 126 (step S114). The content analysis result acquisition unit 126 generates content identification information from the content file names and delivers the generated content identification information to the information providing apparatus 200 to provide instructions to search for content analysis results (step S116). The information providing apparatus 200 returns results of searching for content analysis results corresponding to the received content identification information to the content analysis result acquisition unit 126 as search results (step S118). The content analysis result acquisition unit 126 returns the received search results to the control unit 122 (step S120).

If a search hit occurs (step S122), the application control unit 122 provides instruction to the content analysis result read/write management unit 130 to write content analysis results (step S124). If no search hit occurs (step S126), the application control unit 122 provides instructions to the content analysis unit 128 to perform a content analysis (step S128) and receives content analysis results returned from the content analysis unit 128. The application control unit 122 provides instructions to the content analysis result read/write management unit 130 to write the content analysis results (step S132) and provides instructions to the content analysis result transmission unit 124 to transmit the content analysis results (step S134).

In the foregoing, the information processing method according to an embodiment of the present invention has been described using FIG. 17. Subsequently, details of individual processing in the information processing method according to an embodiment of the present invention will be described.

[Flow of Processing by the Information Processing Apparatus 100]

Figure 18:
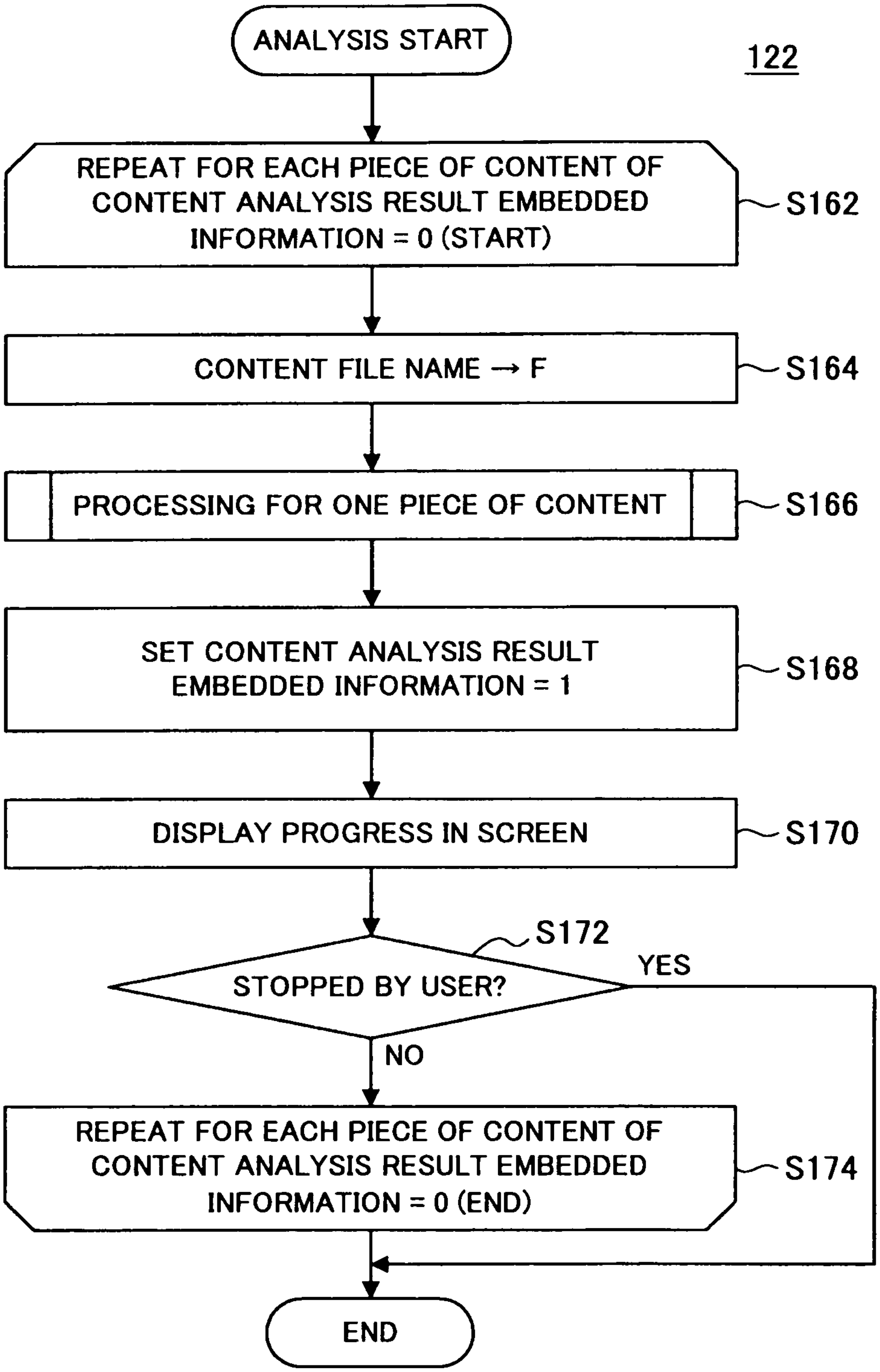
FIG. 18 is a flow chart showing the flow of processing performed by a control unit of the information processing apparatus according to the first embodiment of the present invention.

FIG. 18 is a flow chart showing the flow of processing performed by the control unit 122 of the information processing apparatus 100 according to the first embodiment of the present invention. Processing performed by the control unit 122 of the information processing apparatus 100 according to the first embodiment of the present invention will be described below using FIG. 18.

When, as described above, instructions to start analysis of content are received from the UI unit 120, the control unit 122 of the information processing apparatus 100 repeats processing of step S162 to step S174 on each piece of content of content analysis result embedded information 152*g*=0 (not embedded) of the content related information 152 (step S162). First, the control unit 122 sets the content file name 152*e* to F (step S164) to perform processing for one piece of content (step S166). Subsequently, the control unit 122 sets content analysis result embedded information 152*g*=1 (embedded) (step S168) and displays progress of content analysis results in the screen of the display unit 112 (step S170). The control unit 122 determines whether instructions to stop processing have been provided by the user (step S172). If instructions to stop processing have been provided by the user ("YES" at step S172), the control unit 122 terminates processing performed by the control unit 122. If instructions to stop processing have not been provided by the user ("NO" at step S172), the control unit 122 returns to the end of the repeated processing (step S174) or the start of the repeated processing (step S162).

Figure 19:
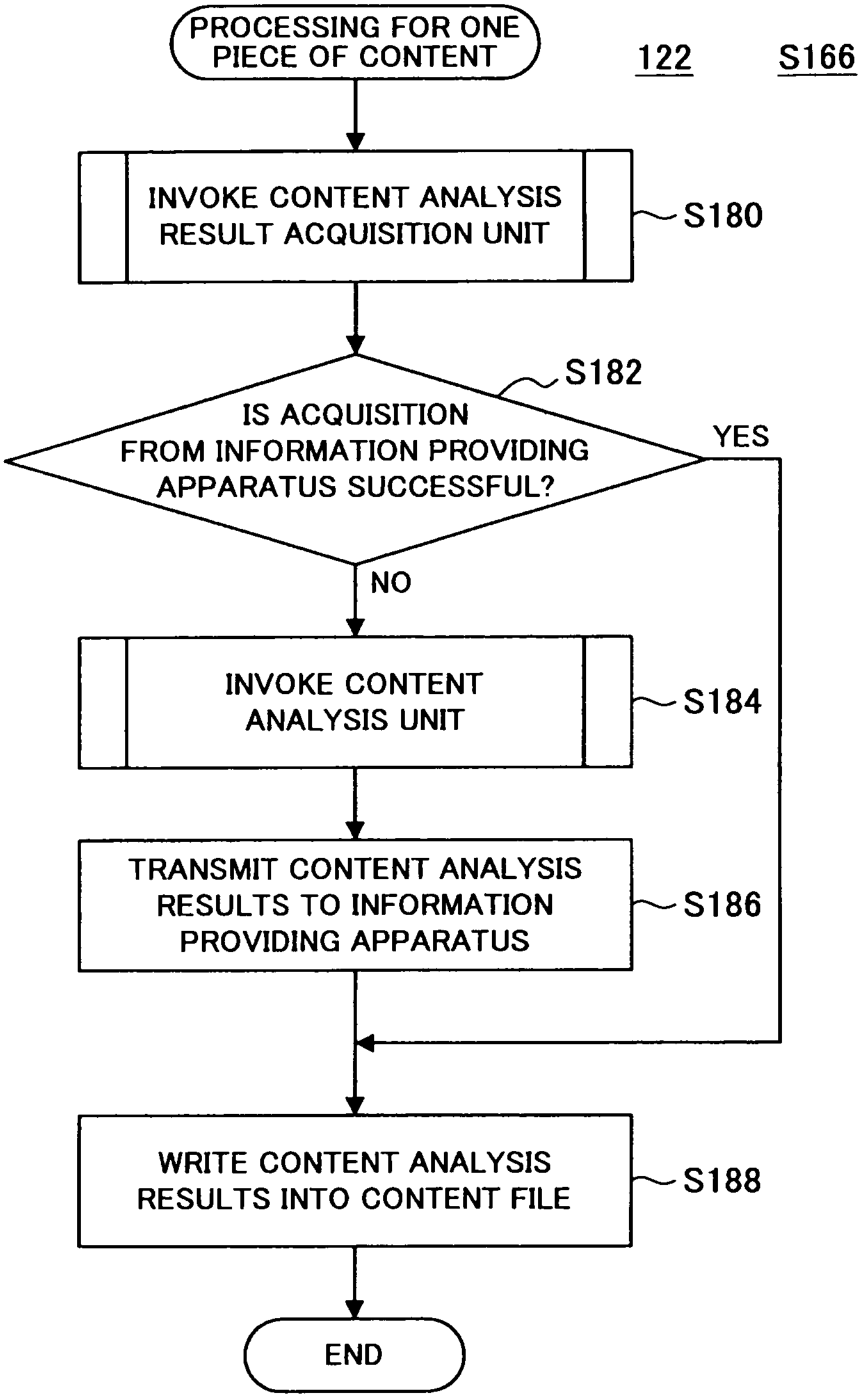
FIG. 19 is a flow chart showing the flow of processing for one piece of content performed by the control unit of the information processing apparatus according to the first embodiment of the present invention.

FIG. 19 is a flow chart showing the flow of processing for one piece of content performed by the control unit 122 of the information processing apparatus 100 according to the first embodiment of the present invention. Processing for one piece of content performed by the control unit 122 of the information processing apparatus 100 according to the first embodiment of the present invention will be described below using FIG. 19. This processing for one piece of content corresponds to step S166 shown in FIG. 18.

In the processing for one piece of content, the control unit 122 first invokes the content analysis result acquisition unit 126 (step S180) to cause the content analysis result acquisition unit 126 to perform processing to acquire content analysis results from the information providing apparatus 200. If the control unit 122 determines that content analysis results have successfully been acquired from the information providing apparatus 200 ("YES" at step S182), the control unit 122 continues to step S188. If the control unit 122 determines that acquisition of content analysis results from the information providing apparatus 200 failed ("NO" at step S182), the control unit 122 invokes the content analysis unit 128 (step S184) to cause the content analysis unit 128 to perform processing to analyze content. Then, the control unit 122 transmits content analysis results to the information providing apparatus 200 (step S186) before continuing to step S188. At step S188, the content analysis results are written into the content file 151 before terminating processing for one piece of content.

FIG. 20 is a table showing a summary of processing for one piece of content performed by the control unit 122 of the information processing apparatus 100 according to the first embodiment of the present invention. Processing for one piece of content performed by the control unit 122 of the information processing apparatus 100 according to the first embodiment of the present invention will be described below using FIG. 20.

As shown in FIG. 20, if content analysis results are present in the information providing apparatus 200, the information processing apparatus 100 uses content analysis results acquired from the information providing apparatus 200 for processing for one piece of content. If no content analysis result is present in the information providing apparatus 200, the information processing apparatus 100 itself performs a content analysis and transmits content analysis results to the information providing apparatus 200.

Figure 21:
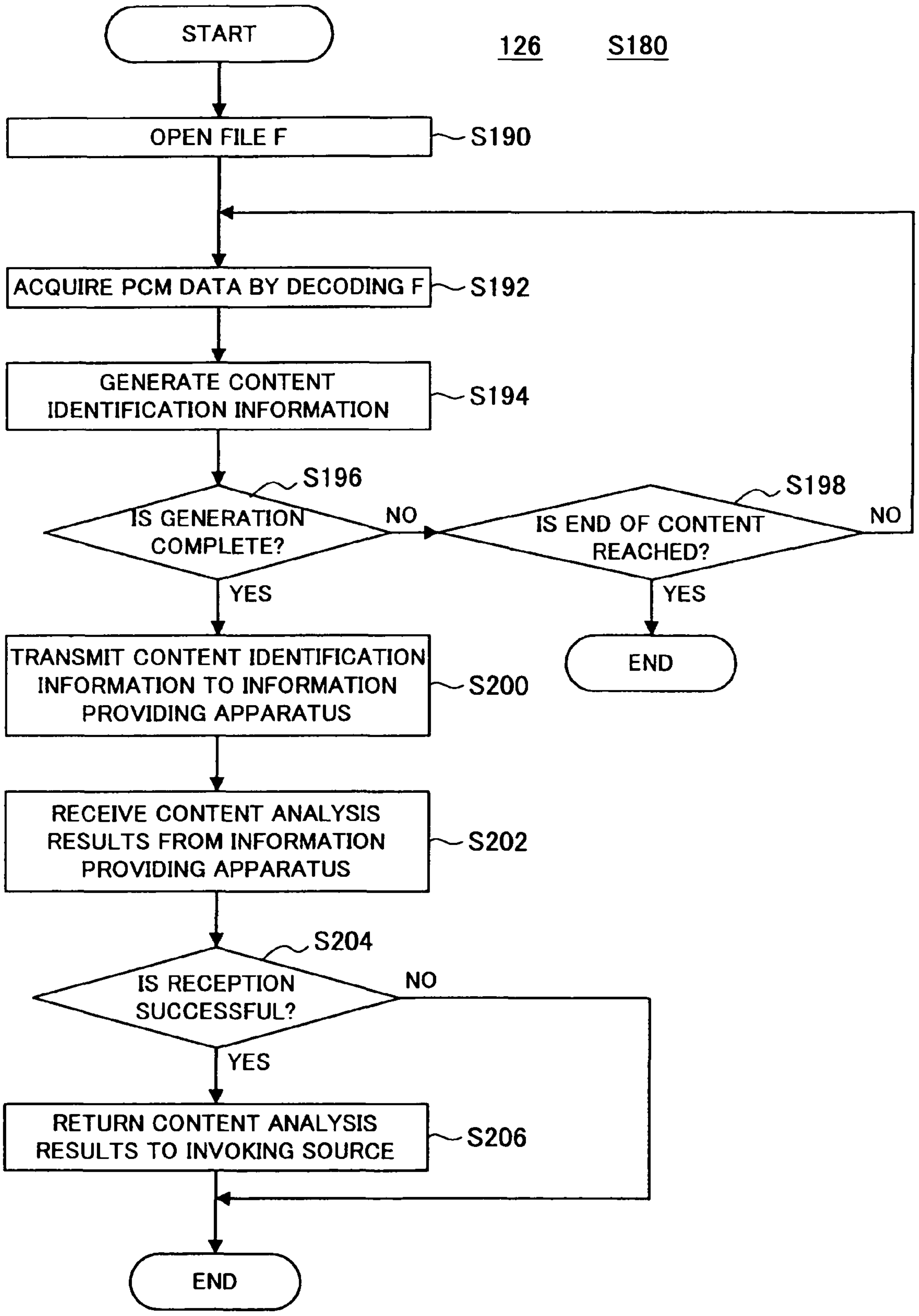
FIG. 21 is a flow chart showing the flow of processing performed by a content analysis result acquisition unit of the information processing apparatus according to the first embodiment of the present invention.

FIG. 21 is a flow chart showing the flow of processing performed by the content analysis result acquisition unit 126 of the information processing apparatus 100 according to the first embodiment of the present invention. Processing performed by the content analysis result acquisition unit 126 of the information processing apparatus 100 according to the first embodiment of the present invention will be described below using FIG. 21. This processing corresponds to step S180 shown in FIG. 19.

The content analysis result acquisition unit 126 of the information processing apparatus 100 opens a file F (whose content file name is set by the control unit 122) (step S190) and decodes the file F to acquire PCM data (step S192). Subsequently, the content analysis result acquisition unit 126 generates content identification information based on the PCM data (step S194). The content analysis result acquisition unit 126 determines whether generation of content identification information is completed (step S196).

If the content analysis result acquisition unit 126 determines that generation of content identification information is not completed ("NO" at step S196), the content analysis result acquisition unit 126 determines whether the end of content is reached (step S198). If the content analysis result acquisition unit 126 determines that the end of content is reached ("YES" at step S198), the content analysis result acquisition unit 126 determines that the end of content is reached before generation of content identification information is completed and terminates processing. If the content analysis result acquisition unit 126 determines that the end of content is not reached ("NO" at step S198), the content analysis result acquisition unit 126 returns to step S192 to generate content identification information using a continued portion of content data.

If the content analysis result acquisition unit 126 determines that generation of content identification information is completed ("YES" at step S196), the content analysis result acquisition unit 126 transmits the content identification information to the information providing apparatus 200 (step S200) and receives content analysis results from the information providing apparatus 200 (step S202). If the content analysis result acquisition unit 126 determines that reception of content analysis results failed ("NO" at step S204), the content analysis result acquisition unit 126 terminates processing. If the content analysis result acquisition unit 126 determines that content analysis results have successfully been received ("YES" at step S204), the content analysis result acquisition unit 126 returns content analysis results to the invoking source (step S206) before terminating processing.

Figure 22:
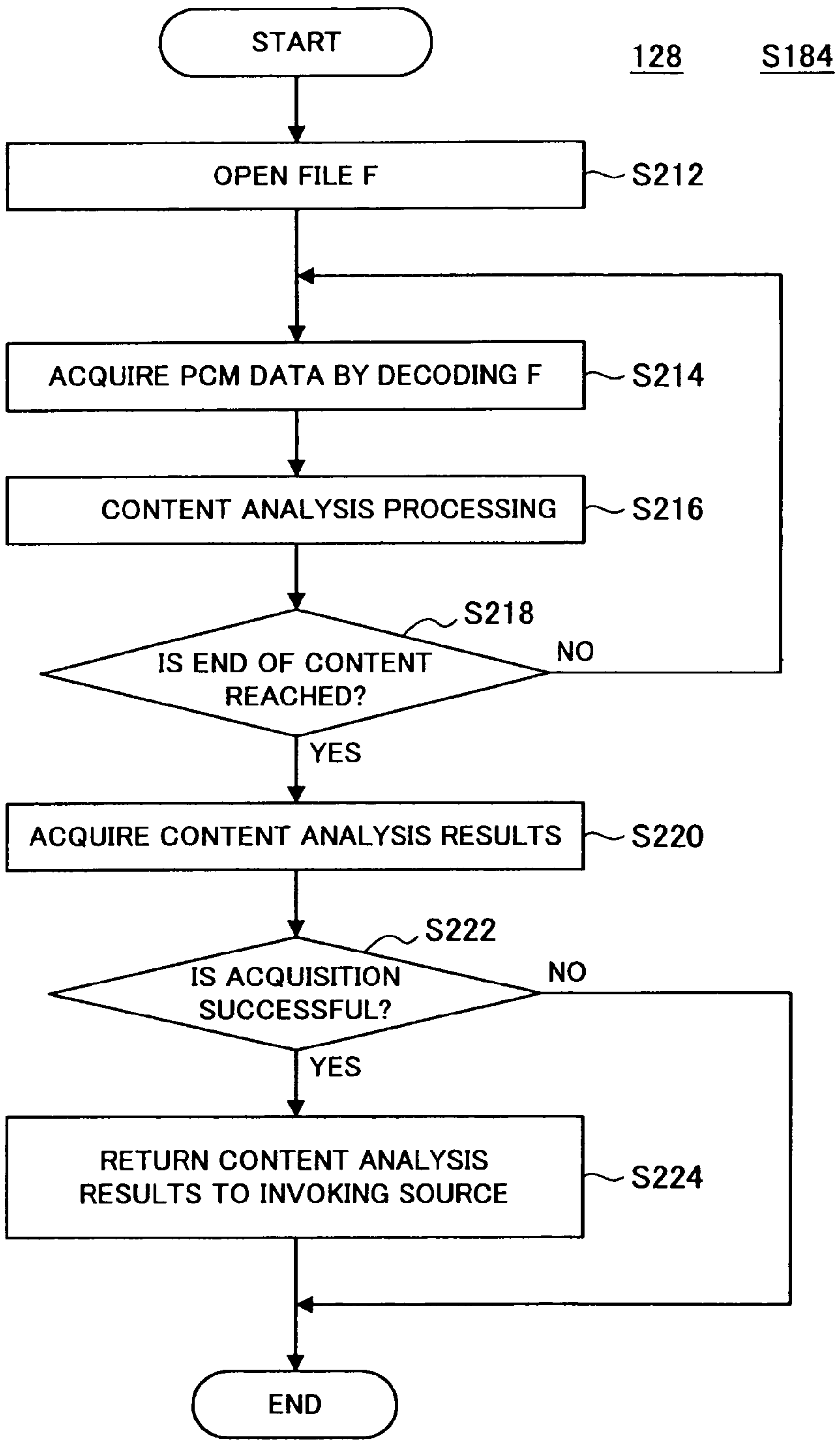
FIG. 22 is a flow chart showing the flow of processing performed by a content analysis unit of the information processing apparatus according to the first embodiment of the present invention.

FIG. 22 is a flow chart showing the flow of processing performed by the content analysis unit 128 of the information processing apparatus 100 according to the first embodiment of the present invention. Processing performed by the content analysis unit 128 of the information processing apparatus 100 according to the first embodiment of the present invention will be described below using FIG. 22. This processing corresponds to step S184 shown in FIG. 19.

The content analysis unit 128 of the information processing apparatus 100 opens the file F (whose content file name is set by the control unit 122) (step S212) and decodes the file F to acquire PCM data (step S214). Subsequently, the content analysis unit 128 performs content analysis processing by analyzing the PCM data (step S216). The content analysis unit 128 determines whether the end of content is reached (step S218). If the content analysis unit 128 determines that the end of content is not reached ("NO" at step S218), the content analysis unit 128 determines that the content analysis processing is not completed and returns to step S214 to continue the content analysis processing. If the content analysis unit 128 determines that the end of content is reached ("YES" at step S218), the content analysis unit 128 determines that the content analysis processing is completed and acquires content analysis results (step S220) to determine whether content analysis results have successfully been acquired (step S222). If the content analysis unit 128 determines that acquisition of content analysis results failed ("NO" at step S222), the content analysis unit 128 terminates processing. If the content analysis unit 128 determines that content analysis results have successfully been acquired ("YES" at step S222), the content analysis unit 128 returns content analysis results to the invoking source (step S224) before terminating processing.

[Flow of Processing by the Information Providing Apparatus 200]

Figure 23:
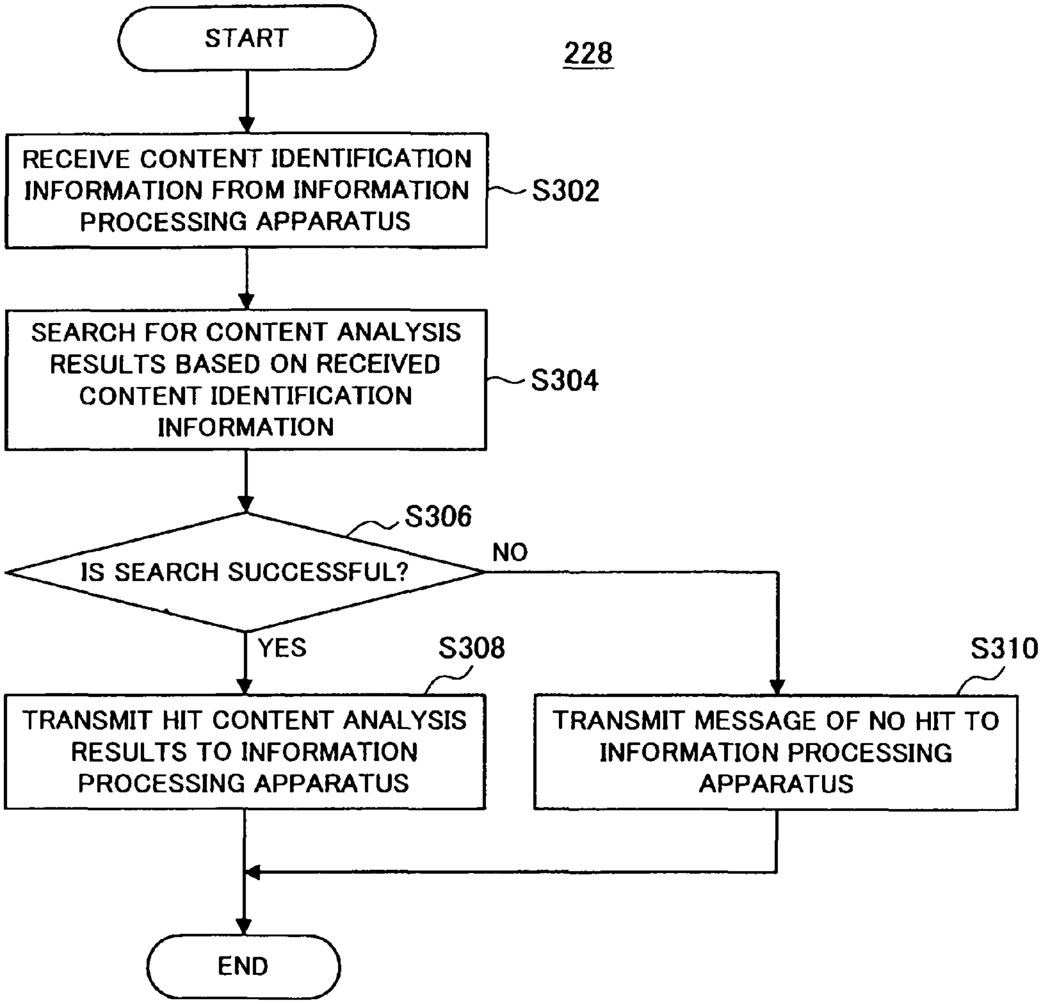
FIG. 23 is a flow chart showing the flow of processing performed by a content analysis result search unit of the information providing apparatus according to the first embodiment of the present invention.

FIG. 23 is a flow chart showing the flow of processing performed by the content analysis result search unit 228 of the information providing apparatus 200 according to the first embodiment of the present invention. Processing performed by the content analysis result search unit 228 of the information providing apparatus 200 according to the first embodiment of the present invention will be described below using FIG. 23.

When content identification information is received from the information processing apparatus 100 (step S302), the content analysis result search unit 228 of the information providing apparatus 200 searches for content analysis results based on the received content identification information (step S304). Subsequently, the content analysis result search unit 228 determines whether the search is successful (step S306). If the search failed ("NO" at step S306), the content analysis result search unit 228 transmits a message indicating that no search hit occurred to the information processing apparatus 100 (step S310) before terminating processing. If the search is successful ("YES" at step S306), the content analysis result search unit 228 transmits hit content analysis results to the information processing apparatus 100 (step S308) before terminating processing.

Figure 24:
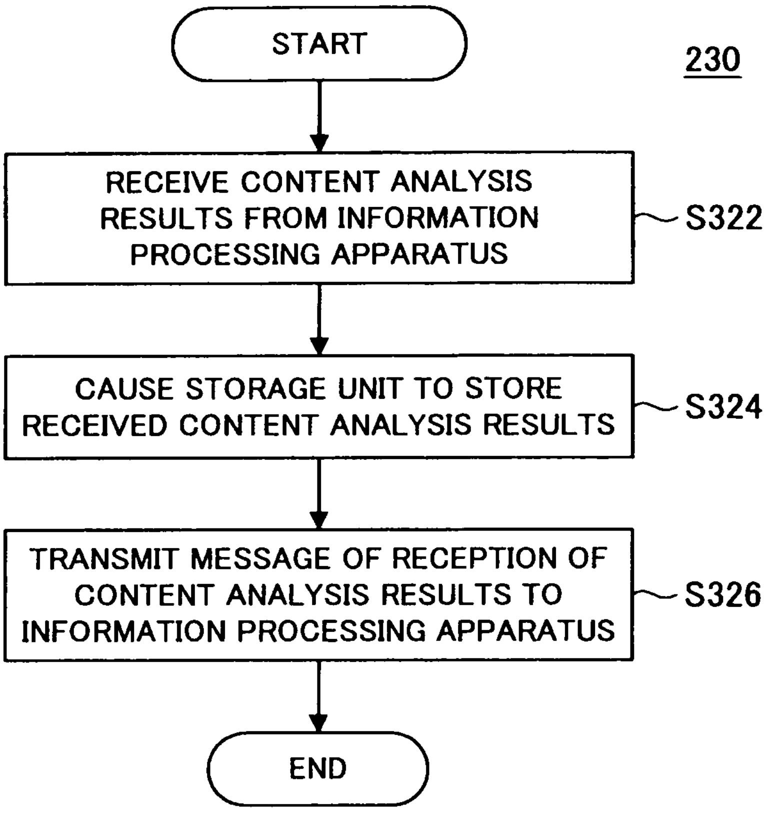
FIG. 24 is a flow chart showing the flow of processing performed by a content analysis result registration unit of the information providing apparatus according to the first embodiment of the present invention.

FIG. 24 is a flow chart showing the flow of processing performed by the content analysis result registration unit 230 of the information providing apparatus 200 according to the first embodiment of the present invention. Processing performed by the content analysis result registration unit 230 of the information providing apparatus 200 according to the first embodiment of the present invention will be described below using FIG. 24.

When content analysis results are received from the information processing apparatus 100 (step S322), the content analysis result registration unit 230 of the information providing apparatus 200 causes the storage unit 240 to store the received content analysis results (step S324). Subsequently, the content analysis result registration unit 230 transmits a message indicating that content analysis results have been received to the information processing apparatus 100 (step S326) before terminating processing.

According to the first embodiment described above, content analysis results for all content held by the information processing apparatus 100 can be used in the information processing apparatus 100 while shortening the content analysis time and reducing loads on the CPU. In the information providing apparatus 200, analysis results of content not yet accumulated can efficiently be collected. Since content analysis results present in the information providing apparatus 200 are not uploaded, loads on the information providing apparatus 200 can also be reduced. Moreover, content analysis results are efficiently accumulated in the information providing apparatus 200 and thus, if content analysis results are searched for from the information providing apparatus 200, an effect of an improved hit rate can also be achieved.

Subsequently, modifications of the present embodiment will be described.

2. First Modification of the First Embodiment

When compared with the first embodiment, a first modification of the first embodiment is different in functionality of the information processing apparatus 100. The function configuration of the information processing apparatus 100 according to the first modification of the first embodiment is similar to the configuration shown in FIG. 3. Thus, the function of the information processing apparatus 100 according to the first modification of the first embodiment will be described using FIG. 3.

Before causing the content analysis unit 128 to perform processing to obtain content analysis results by analyzing content data stored in the storage unit 150, the control unit 122 determines whether content analysis results are stored in the storage unit 150 by being associated with content data stored in the storage unit 150. If the control unit 122 determines that content analysis results are already stored in the storage unit 150, the control unit 122 omits processing. That is, the control unit 122 omits processing to cause the content analysis unit 128 to perform processing to obtain content analysis results by analyzing content data stored in the storage unit 150. The control unit 122 also omits processing to cause the storage unit 150 to store content analysis results obtained by the content analysis unit 128 by associating with content data stored in the storage unit 150.

[Flow of Processing by the Information Processing Apparatus 100]

Figure 25:
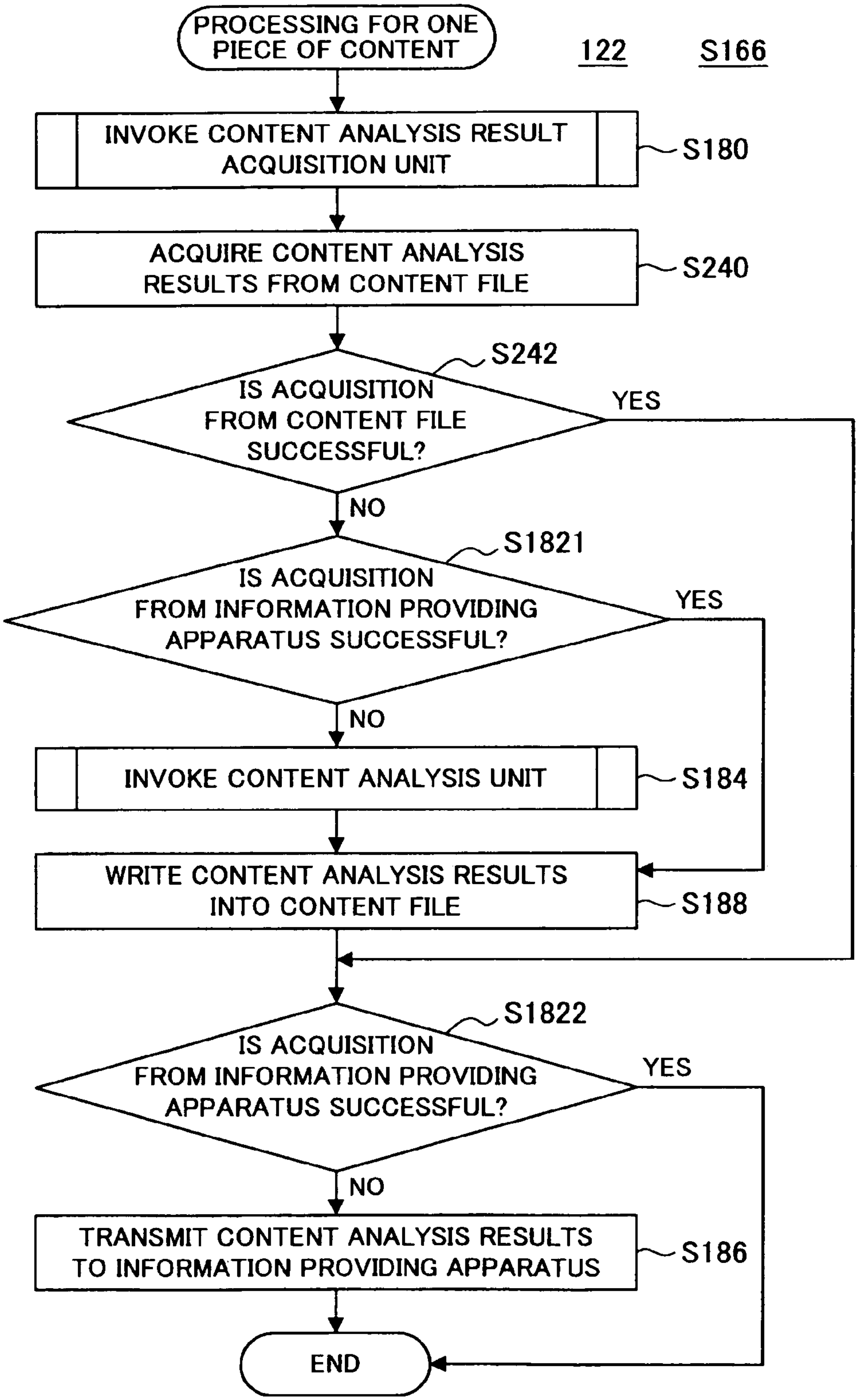
FIG. 25 is a flow chart showing the flow of processing for one piece of content performed by the control unit of the information processing apparatus according to a first modification of the first embodiment of the present invention.

FIG. 25 is a flow chart showing the flow of processing for one piece of content performed by the control unit 122 of the information processing apparatus 100 according to the first modification of the first embodiment of the present invention. Processing for one piece of content performed by the control unit 122 of the information processing apparatus 100 according to the first modification of the first embodiment of the present invention will be described below using FIG. 25.

In the processing for one piece of content, the control unit 122 first invokes the content analysis result acquisition unit 126 (step S180) to cause the content analysis result acquisition unit 126 to perform processing to acquire content analysis results from the information providing apparatus 200. The control unit 122 acquires content analysis results from the content file 151 (step S240) and determines whether content analysis results have successfully been acquired from the content file 151 (step S242). If the control unit 122 determines that content analysis results have successfully been acquired from the content file 151 ("YES" at step S242), the control unit 122 continues to step S1822. If the control unit 122 determines that acquisition of content analysis results from the content file 151 failed ("NO" at step S242), the control unit 122 determines whether content analysis results have successfully been acquired from the information providing apparatus 200 (step S1821).

If the control unit 122 determines that content analysis results have successfully been acquired from the information providing apparatus 200 ("YES" at step S1821), the control unit 122 continues to step S188. If the control unit 122 determines that acquisition of content analysis results from the information providing apparatus 200 failed ("NO" at step S1821), the control unit 122 invokes the content analysis unit 128 (step S184) to cause the content analysis unit 128 to perform processing to analyze content. At step S188, the control unit 122 writes content analysis results into the content file 151. At step S1822, the control unit 122 determines whether content analysis results have successfully been acquired from the information providing apparatus 200. If the control unit 122 determines that content analysis results have successfully been acquired from the information providing apparatus 200 ("YES" at step S1822), the control unit 122 terminates processing for one piece of content. If the control unit 122 determines that acquisition of content analysis results from the information providing apparatus 200 failed ("NO" at step S1822), the control unit 122 transmits content analysis results to the information providing apparatus 200 (step S186) before terminating processing for one piece of content.

FIG. 26 is a table showing a summary of processing for one piece of content performed by the control unit 122 of the information processing apparatus 100 according to the first modification of the first embodiment of the present invention. Processing for one piece of content performed by the control unit 122 of the information processing apparatus 100 according to the first modification of the first embodiment of the present invention will be described below using FIG. 26.

As shown in FIG. 26, if content analysis results are present in the content file 151, the information processing apparatus 100 uses content analysis results acquired from the content file 151 for processing for one piece of content. If content analysis results are present in the content file 151 and also present in the information providing apparatus 200, the information processing apparatus 100 uses content analysis results acquired from the information providing apparatus 200 and transmits content analysis results to the information providing apparatus 200. If content analysis results are present neither in the content file 151 nor in the information providing apparatus 200, the information processing apparatus 100 performs a content data analysis and transmits content analysis results to the information providing apparatus 200.

According to the first modification of the first embodiment described above, if any content analysis result embedded in a content file is present, an effect of being able to upload also the analysis result to the information providing apparatus 200 is achieved.

3. Second Modification of the First Embodiment

[Function Configuration of the Information Processing Apparatus]

When compared with the first embodiment, a second modification of the first embodiment is different in functionality of the information processing apparatus 100. The function configuration of the information processing apparatus 100 according to the second modification of the first embodiment is similar to the configuration shown in FIG. 3. Thus, the function of the information processing apparatus 100 according to the second modification of the first embodiment will be described using FIG. 3.

Before causing the content analysis result acquisition unit 126 to perform processing to acquire and transmit content identification information stored in the storage unit 150 to the information providing apparatus 200 (another apparatus), the control unit 122 determines whether content analysis results are stored in the storage unit 150 by being associated with content data stored in the storage unit 150.

If the control unit 122 determines that content analysis results are already stored in the storage unit 150, the control unit 122 omits processing. That is, the control unit 122 omits processing to cause the content analysis result acquisition unit 126 to perform processing to acquire and transmit content identification information stored in the storage unit 150 to the information providing apparatus 200. Also, the control unit 122 omits processing to determine whether the content analysis result acquisition unit 126 has received content analysis results from the information providing apparatus 200. Also, the control unit 122 omits processing by the content analysis result acquisition unit 126 to cause the storage unit 150 to store content analysis results received from the information providing apparatus 200 by associating with content data stored in the storage unit 150. Also, the control unit 122 omits processing to cause the content analysis unit 128 to perform processing to acquire content analysis results by analyzing content data stored in the storage unit 150. Also, the control unit 122 omits processing to cause the storage unit 150 to store content analysis results obtained by the content analysis unit 128 by associating with content data stored in the storage unit 150. Also, the control unit 122 omits processing to cause the content analysis result transmission unit 124 to transmit content analysis results obtained by the content analysis unit 128 to the information providing apparatus 200.

[Flow of Processing by the Information Processing Apparatus 100]

Figure 27:
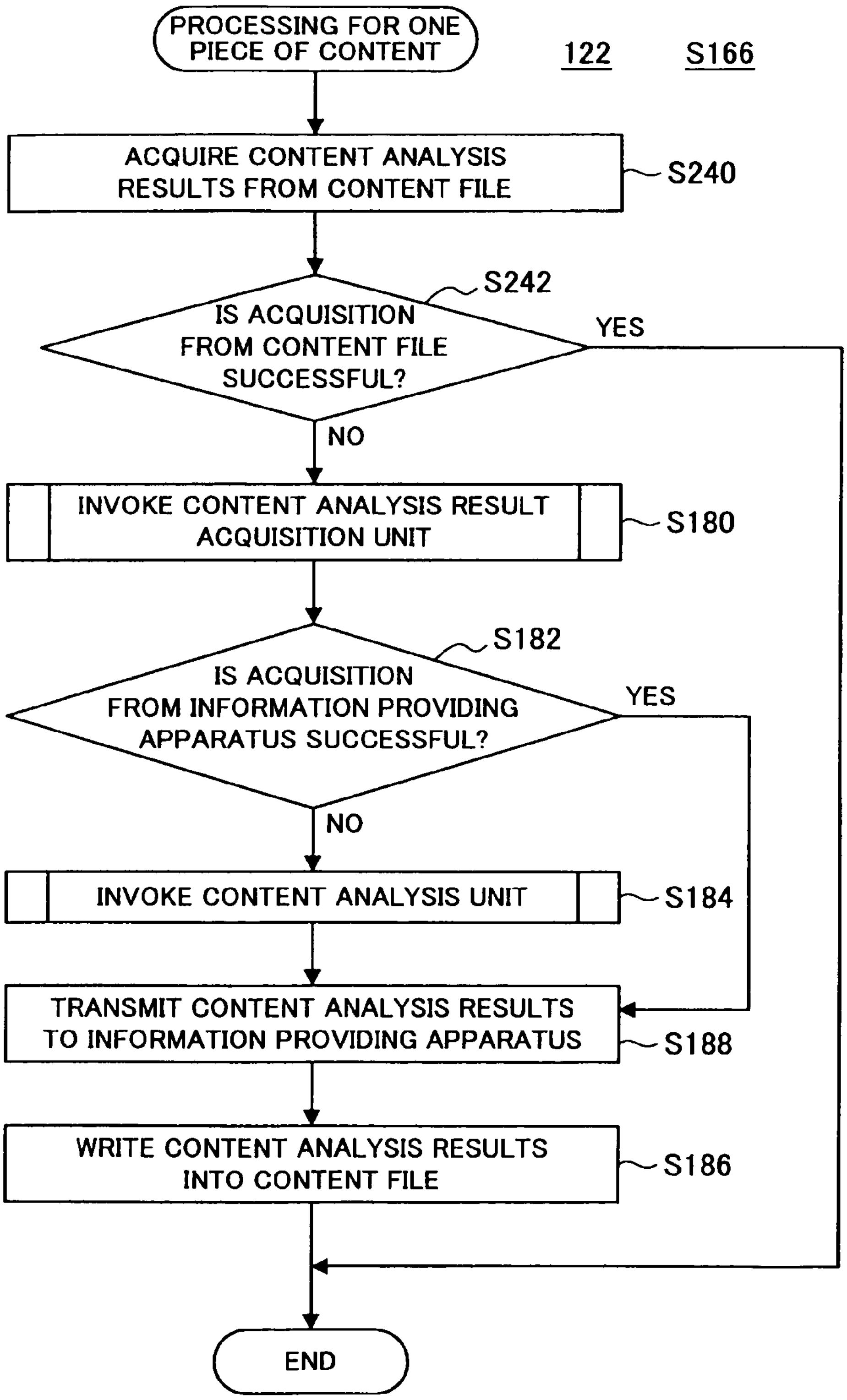
FIG. 27 is a flow chart showing the flow of processing for one piece of content performed by the control unit of the information processing apparatus according to a second modification of the first embodiment of the present invention.

FIG. 27 is a flow chart showing the flow of processing for one piece of content performed by the control unit 122 of the information processing apparatus 100 according to the second modification of the first embodiment of the present invention. Processing for one piece of content performed by the control unit 122 of the information processing apparatus 100 according to the second modification of the first embodiment of the present invention will be described below using FIG. 27.

In the processing for one piece of content, the control unit 122 first acquires content analysis results from the content file 151 (step S240) and determines whether content analysis results have successfully been acquired from the content file 151 (step S242). If the control unit 122 determines that content analysis results have successfully been acquired from the content file 151 ("YES" at step S242), the control unit 122 terminates processing for one piece of content.

If the control unit 122 determines that acquisition of content analysis results from the content file 151 failed ("NO" at step S242), the control unit 122 invokes the content analysis result acquisition unit 126 (step S180) to cause the content analysis result acquisition unit 126 to perform processing to acquire content analysis results from the information providing apparatus 200. If the control unit 122 determines that content analysis results have successfully been acquired from the information providing apparatus 200 ("YES" at step S182), the control unit 122 continues to step S188. If the control unit 122 determines that acquisition of content analysis results from the information providing apparatus 200 failed ("NO" at step S182), the control unit 122 invokes the content analysis unit 128 (step S184) to cause the content analysis unit 128 to perform processing to analyze content. At step S188, the control unit 122 writes content analysis results into the content file 151 and transmits content analysis results to the information providing apparatus 200 (step S186) before terminating processing for one piece of content.

FIG. 28 is a table showing a summary of processing for one piece of content performed by the control unit 122 of the information processing apparatus 100 according to the second modification of the first embodiment of the present invention. Processing for one piece of content performed by the control unit 122 of the information processing apparatus 100 according to the second modification of the first embodiment of the present invention will be described below using FIG. 28.

As shown in FIG. 28, if content analysis results are present in the content file 151 and are not present in the information providing apparatus 200, the information processing apparatus 100 does not transmit content analysis results to the information providing apparatus 200. This is a difference from the first modification of the first embodiment.

According to the second modification of the first embodiment described above, if any content analysis result embedded in a content file is present, an effect of being able to reduce communication loads is achieved because no communication is performed with the information providing apparatus 200.

4. Third Modification of the First Embodiment

[Function Configuration of the Information Processing Apparatus]

When compared with the first embodiment, a third modification of the first embodiment is different in functionality of the information providing apparatus 200. The function configuration of the information providing apparatus 200 according to the third modification of the first embodiment is similar to the configuration shown in FIG. 7. Thus, the function of the information providing apparatus 200 according to the third modification of the first embodiment will be described using FIG. 7.

The information providing apparatus 200 further includes a threshold storage unit to store the threshold. The content analysis result search unit 228 determines whether content analysis results corresponding to content identification information received from the information processing apparatus 100 (another apparatus) are stored in the storage unit 240. If the content analysis result search unit 228 determines that such content analysis results are stored in the storage unit 240, the content analysis result search unit 228 determines whether the number of content analysis results corresponding to content identification information is less than the threshold. If the content analysis result search unit 228 determines that the number of content analysis results is less than the threshold, the content analysis result search unit 228 omits processing to transmit content analysis results to the information processing apparatus 100.

The content analysis result search unit 228 may be enabled to further transmit content analysis result transmission request information indicating a request of transmission of content analysis results to the information processing apparatus 100. In this case, the content analysis result search unit 228 determines whether content analysis results corresponding to content identification information received from the information processing apparatus 100 are stored in the storage unit 240. Then, if the content analysis result search unit 228 determines that such content analysis results are stored in the storage unit 240, the content analysis result search unit 228 determines whether the number of analysis results corresponding to the content identification information is less than the threshold. If the content analysis result search unit 228 determines that the number of analysis results is less than the threshold, the content analysis result search unit 228 transmits content analysis results to the information processing apparatus 100. Moreover, the content analysis result search unit 228 transmits content analysis result transmission request information to the information processing apparatus 100 to receive content analysis results from the information processing apparatus 100.

If the content analysis result search unit 228 is enabled to further transmit content analysis result transmission request information to the information processing apparatus 100, the content analysis result acquisition unit 126 can further receive the content analysis result transmission request information from the apparatus. Then, if the control unit 122 determines that the content analysis result acquisition unit 126 has received content analysis results from the information providing apparatus 200, the control unit 122 causes the storage unit 150 to store the content analysis results by associating with content data stored in the storage unit 150. Moreover, the control unit 122 determines whether the content analysis result acquisition unit 126 has received content analysis result transmission request information from the information providing apparatus 200. If the control unit 122 determines that the content analysis result acquisition unit 126 has received content analysis result transmission request information from the information providing apparatus 200, the control unit 122 causes the content analysis unit 128 to perform processing to analyze content data stored in the storage unit 150 to obtain content analysis results. Further, the control unit 122 causes the content analysis result transmission unit 124 to perform processing to transmit content analysis results to the information providing apparatus 200.

[Flow of Processing by the Information Providing Apparatus 200]

Figure 29:
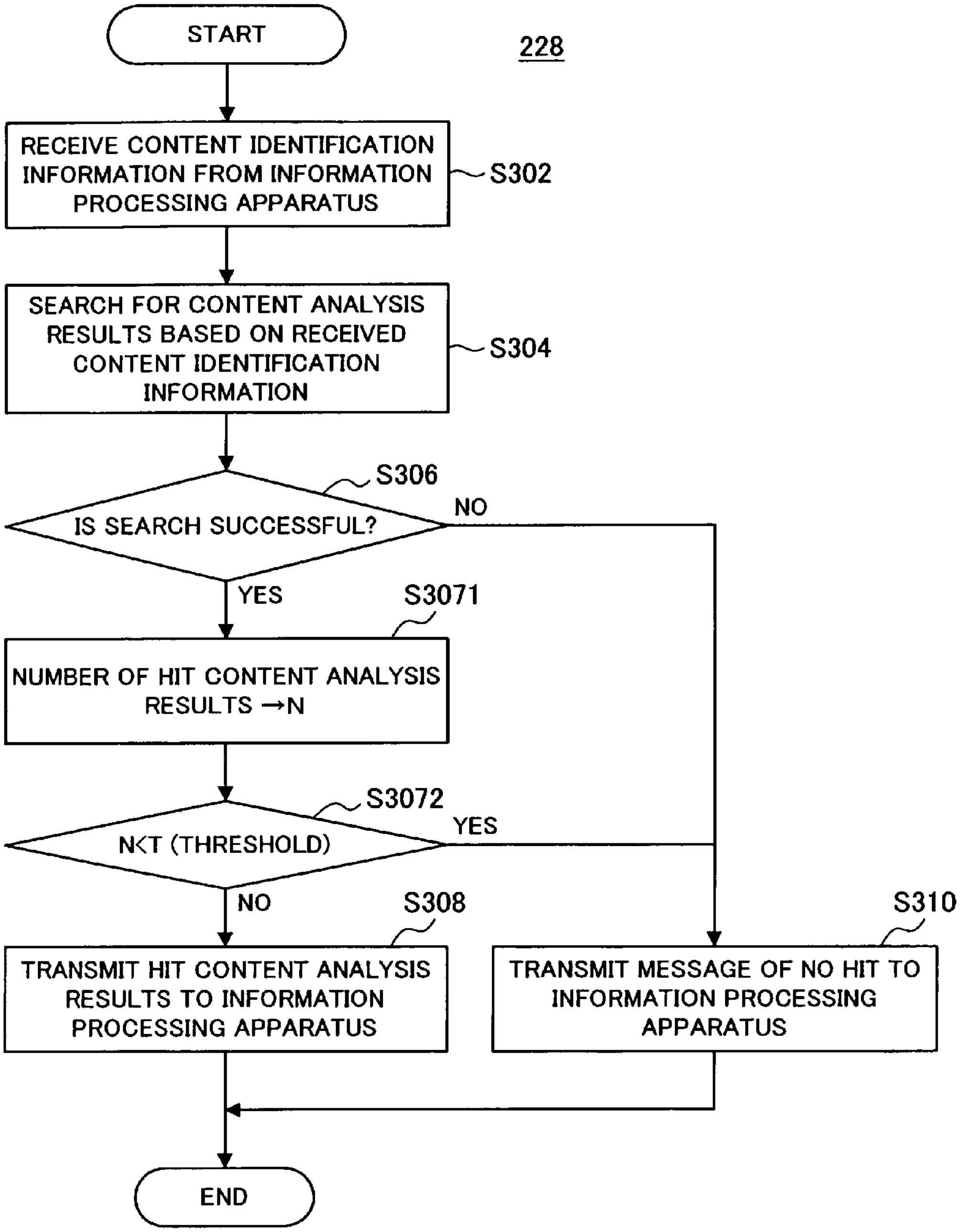
FIG. 29 is a flow chart showing the flow of processing for one piece of content performed by the content analysis result search unit of the information providing apparatus according to a third modification of the first embodiment of the present invention.

FIG. 29 is a flow chart showing the flow of processing for one piece of content performed by the content analysis result search unit 228 of the information providing apparatus 200 according to the third modification of the first embodiment of the present invention. Processing for one piece of content performed by the content analysis result search unit 228 of the information providing apparatus 100 according to the third modification of the first embodiment of the present, invention will be described below using FIG. 29.

When content identification information is received from the information processing apparatus 100 (step S302), the content analysis result search unit 228 of the information providing apparatus 200 searches for content analysis results based on the received content identification information (step S304). Subsequently, the content analysis result search unit 228 determines whether the search is successful (step S306). If the search failed ("NO" at step S306), the content analysis result search unit 228 transmits a message indicating that no search hit occurred to the information processing apparatus 100 (step S310) before terminating processing. If the search is successful ("YES" at step S306), the content analysis result search unit 228 sets the number of content analysis results hit in the search to N and (step S312) and determines whether N is less than a threshold Y (step S306). If the content analysis result search unit 228 determines that N is less than T ("YES" at step S306), the content analysis result search unit 228 transmits a message indicating that no search hit occurred to the information processing apparatus 100 (step S310) before terminating processing. If the content analysis result search unit 228 determines that N is not less than T ("NO" at step S306), the content analysis result search unit 228 transmits hit content analysis results to the information processing apparatus 100 (step S308) before terminating processing.

FIG. 30 is a table showing a summary of processing for one piece of content performed by the content analysis result search unit 228 of the information providing apparatus 200 according to the third modification of the first embodiment of the present invention. Processing for one piece of content performed by the content analysis result search unit 228 of the information processing apparatus 100 according to the third modification of the first embodiment of the present invention will be described below using FIG. 30.

As shown in FIG. 30, if content analysis results are present in the information providing apparatus 200, content analysis results may be transmitted to the information providing apparatus 200 in processing for one piece of content. This is a difference from the first embodiment.

According to the third modification of the first embodiment described above, a plurality of content analysis results can be collected in the information providing apparatus 200 for one piece of content. Therefore, the information providing apparatus 200 can calculate an average value of the plurality of content analysis results or select the most frequent analysis result based on the principle of majority rule. Or, a content analysis result judged to be correct by visual inspection of a person can be selected. Accordingly, an effect of being able to improve precision of content analysis results accumulated in the information providing apparatus 200 is achieved.

5. Fourth Modification of the First Embodiment

[Function Configuration of the Information Processing Apparatus]

When compared with the first embodiment, a fourth modification of the first embodiment is different in functionality of the information processing apparatus 100. The function configuration of the information processing apparatus 100 according to the fourth modification of the first embodiment is similar to the configuration shown in FIG. 3. Thus, the function of the information processing apparatus 100 according to the fourth modification of the first embodiment will be described using FIG. 3.

The storage unit 150 of the information processing apparatus 100 can further store apparatus identification information corresponding to the apparatus that analyzes content data. The apparatus identification information may be an application ID corresponding to the application used for analyzing content data or the like.

When the control unit 122 causes the storage unit 150 to store content analysis results by associating with content data stored in the storage unit 150, the control unit 122 causes the storage unit 150 to store apparatus identification information corresponding to the local apparatus by further associating with content analysis results. If the control unit 122 determines that content analysis results are already stored in the storage unit 150, the control unit 122 acquires apparatus identification information corresponding to the content analysis results. If the control unit 122 determines that the acquired apparatus identification information does not correspond to the local apparatus, the control unit 122 does not omit processing to cause the content analysis unit 128 to perform processing to acquire content analysis results by analyzing content data stored in the storage unit 150. This is because content analysis by the mobile terminal 300 or the like is performed on a portion of a predetermined time (such as 5 sec) from the head of content data and content analysis by the information processing apparatus 100 is frequently more precise than that by the mobile terminal 300 or the like. Content analysis by the information processing apparatus 100 may be performed on the whole content data or a portion thereof of a predetermined time (for example, time longer than 5 sec) from the head of content data. Moreover, the control unit 122 does not omit processing to cause the storage unit 150 to store content analysis results obtained by the content analysis unit 128 by associating with content data stored in the storage unit 150.

[Flow of Processing by the Information Processing Apparatus 100]

Figure 31:
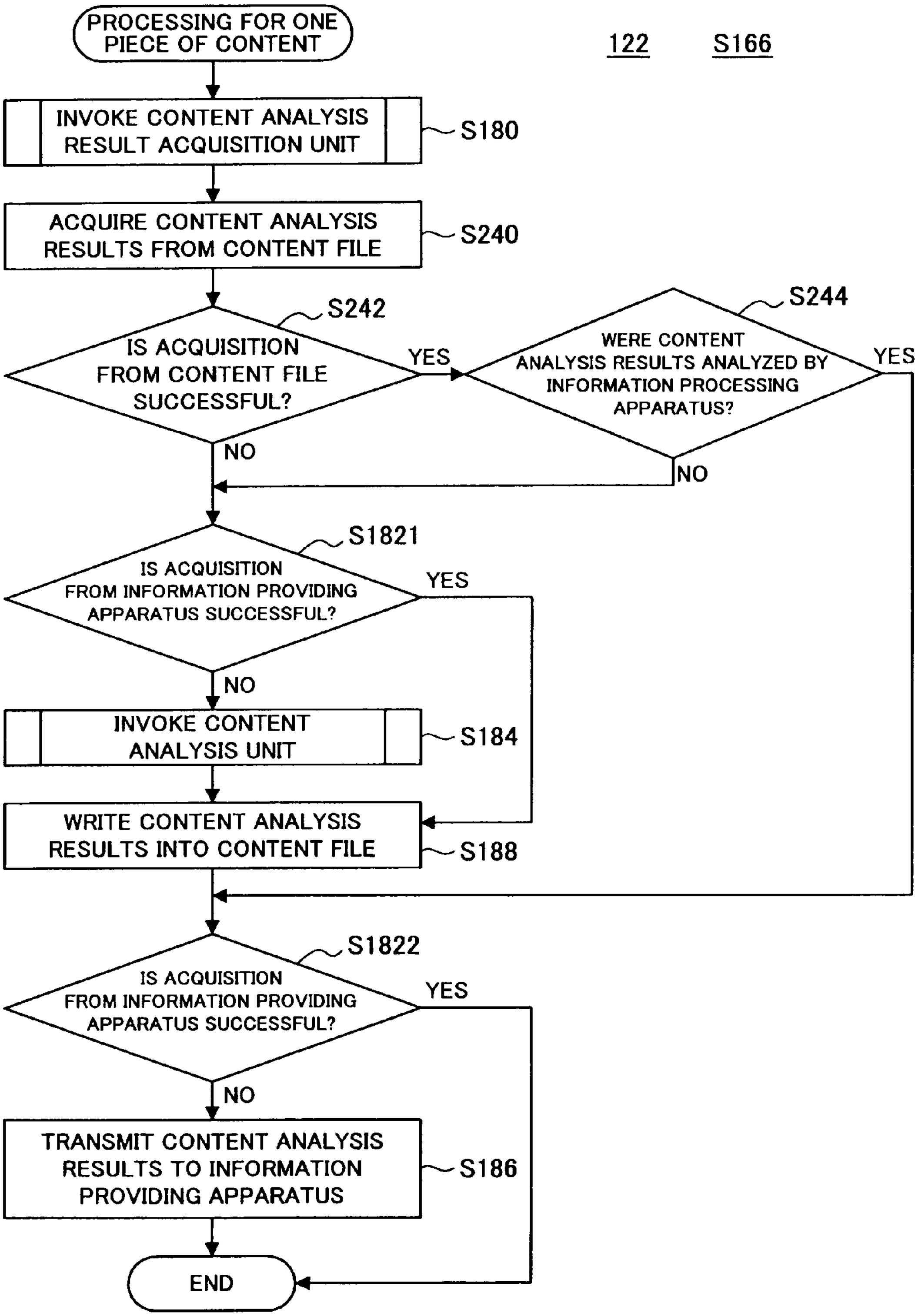
FIG. 31 is a flow chart showing the flow of processing for one piece of content performed by the control unit of the information processing apparatus according to a fourth modification of the first embodiment of the present invention.

FIG. 31 is a flow chart showing the flow of processing for one piece of content performed by the control unit 122 of the information processing apparatus 100 according to the fourth modification of the first embodiment of the present invention. Processing for one piece of content performed by the control unit 122 of the information processing apparatus 100 according to the fourth modification of the first embodiment of the present invention will be described below using FIG. 31.

In the processing for one piece of content, the control unit 122 first invokes the content analysis result acquisition unit 126 (step S180) to cause the content analysis result acquisition unit 126 to perform processing to acquire content analysis results from the information providing apparatus 200. The control unit 122 acquires content analysis results from the content file 151 (step S240) and determines whether content analysis results have successfully been acquired from the content file 151 (step S242). If the control unit 122 determines that acquisition of content analysis results from the content file 151 failed ("NO" at step S242), the control unit 122 continues to step S1821. If the control unit 122 determines that content analysis results have successfully been acquired from the content file 151 ("YES" at step S242), the control unit 122 determines whether the content analysis results were analyzed by the information processing apparatus 100 (step S244). If the control unit 122 determines that the content analysis results were analyzed by the information processing apparatus 100 ("NO" at step S244), the control unit 122 continues to step S1822. If the control unit 122 determines that the content analysis results were not analyzed by the information processing apparatus 100, the control unit 122 continues to step S1821.

At step S1821, the control unit 122 determines whether content analysis results have successfully been acquired from the information providing apparatus 200. If the control unit 122 determines that content analysis results have successfully been acquired from the information providing apparatus 200 ("YES" at step S1821), the control unit 122 continues to step S188. If the control unit 122 determines that acquisition of content analysis results from the information providing apparatus 200 failed ("NO" at step S1821), the control unit 122 invokes the content analysis unit 128 (step S184) to cause the content analysis unit 128 to perform processing to analyze content. At step S188, the control unit 122 writes content analysis results into the content file 151. At step S1822, the control unit 122 determines whether content analysis results have successfully been acquired from the information providing apparatus 200. If the control unit 122 determines that content analysis results have successfully been acquired from the information providing apparatus 200 ("YES" at step S1822), the control unit 122 terminates processing for one piece of content. If the control unit 122 determines that acquisition of content analysis results from the information providing apparatus 200 failed ("NO" at step S1822), the control unit 122 transmits content analysis results to the information providing apparatus 200 (step S186) before terminating processing for one piece of content.

FIG. 32 is a table showing a summary of processing for one piece of content performed by the control unit 122 of the information processing apparatus 100 according to the fourth modification of the first embodiment of the present invention. Processing for one piece of content performed by the control unit 122 of the information processing apparatus 100 according to the fourth modification of the first embodiment of the present invention will be described below using FIG. 32.

In FIG. 32, apparatuses that generated content analysis results are shown in parentheses under "Is any content analysis result present in content files?". As shown in FIG. 32, processing when the apparatus that generated content analysis results is the information processing apparatus 100 is the same as that in the first modification of the first embodiment of the present invention. Processing when the apparatus that generated content analysis results is the mobile terminal 300 is different from that in the first modification of the first embodiment of the present invention. More specifically, the control unit 122 performs a content analysis and transmits content analysis results to the information providing apparatus 200.

According to the fourth modification of the first embodiment described above, if content analysis results are accumulated in the information processing apparatus 100, more precise content analysis results can be obtained by determining the generator of the content analysis results. Accordingly, an effect of being able to improve precision of content analysis results accumulated in the information providing apparatus 200 is achieved.

6. Fifth Modification of the First Embodiment

[Function Configuration of the Information Processing Apparatus]

When compared with the first embodiment, a fifth modification of the first embodiment is different in functionality of the information processing apparatus 100. The function configuration of the information processing apparatus 100 according to the fifth modification of the first embodiment is similar to the configuration shown in FIG. 3. Thus, the function of the information processing apparatus 100 according to the fifth modification of the first embodiment will be described using FIG. 3.

The control unit 122 determines whether the information providing apparatus 200 is communicable before the content analysis result acquisition unit 126 being caused to perform processing to acquire content identification information stored in the storage unit 150 to transmit the content identification information to the information providing apparatus 200.

If the control unit 122 determines that the information providing apparatus 200 is not communicable, the control unit 122 omits processing to cause the content analysis result acquisition unit 126 to perform processing to acquire content identification information stored in the storage unit 150 to transmit the content identification information to the information providing apparatus 200. Then, the control unit 122 determines that the content analysis result acquisition unit 126 has not received content analysis results from the information providing apparatus 200 and causes the content analysis unit 128 to perform processing to obtain content analysis results by analyzing content data stored in the storage unit 150. The control unit 122 also causes the storage unit 150 to store content analysis results obtained by the content analysis unit 128 by associating with content data stored in the storage unit 150. Then, the control unit 122 omits processing to cause the content analysis result transmission unit 124 to perform processing to transmit content analysis results obtained by the content analysis unit 128 to the information providing apparatus 200.

If the control unit 122 determines that the information providing apparatus 200 has become communicable, the control unit 122 causes the content analysis result acquisition unit 126 to perform processing to acquire and transmit content identification information stored in the storage unit 150 to the information providing apparatus 200. Whether being communicable is determined, for example, when a connection is attempted to be established with the information providing apparatus 200 next time or when content identification information is transmitted to the information providing apparatus 200 next time. Then, the control unit 122 determines whether the content analysis result acquisition unit 126 has received content analysis results from the information providing apparatus 200. If the control unit 122 determines that the content analysis result acquisition unit 126 has not received content analysis results from the information providing apparatus 200, the control unit 122 causes the content analysis result transmission unit 124 to perform processing to transmit content analysis results stored in the storage unit 150 by being associated with content data stored in the storage unit 150 to the information providing apparatus 200.

[Flow of Processing by the Information Processing Apparatus 100]

Figure 33:
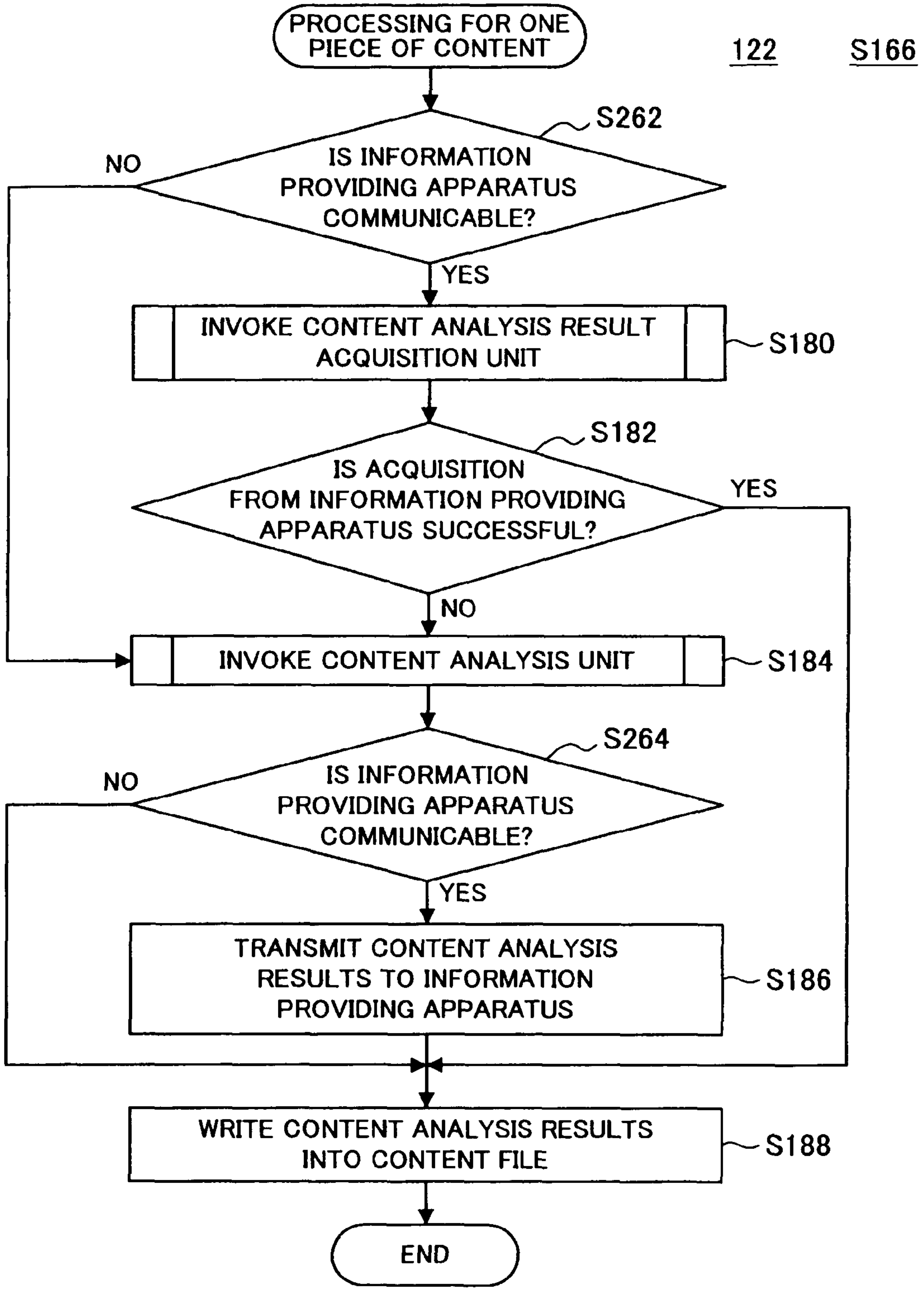
FIG. 33 is a flow chart showing the flow of processing for one piece of content performed by the control unit of the information processing apparatus according to a fifth modification of the first embodiment of the present invention.

FIG. 33 is a flow chart showing the flow of processing for one piece of content performed by the control unit 122 of the information processing apparatus 100 according to the fifth modification of the first embodiment of the present invention. Processing for one piece of content performed by the control unit 122 of the information processing apparatus 100 according to the fifth modification of the first embodiment of the present invention will be described below using FIG. 33.

In the processing for one piece of content, the control unit 122 first determines whether the information providing apparatus 200 is communicable (step S262). If the control unit 122 first determines that the information providing apparatus 200 is not communicable ("NO" at step S262), the control unit 122 continues to step S184. If the control unit 122 first determines that the information providing apparatus 200 is communicable ("NO" at step S262), the control unit 122 invokes the content analysis result acquisition unit 126 (step S180) and causes the content analysis result acquisition unit 126 to perform processing to acquire content analysis results from the information providing apparatus 200. If the control unit 122 determines that content analysis results have successfully been acquired from the information providing apparatus 200 ("YES" at step S182), the control unit 122 continues to step S188. If the control unit 122 determines that acquisition of content analysis results from the information providing apparatus 200 failed ("NO" at step S182), the control unit 122 continues to step S184.

When the control unit 122 continues to step S184, the control unit 122 invokes the content analysis unit 128 (step S184) to cause the content analysis unit 128 to perform processing to analyze content. Then, the control unit 122 determines whether the information providing apparatus 200 is communicable (step S264). If the control unit 122 determines that the information providing apparatus 200 is not communicable ("NO" at step S264), the control unit 122 continues to step S188. If the control unit 122 first determines that the information providing apparatus 200 is communicable ("YES" at step S264), the control unit 122 transmits content analysis results to the information providing apparatus 200 (step S186) before continuing to step S188. At step S188, the control unit 122 writes content analysis results into the content file 151 before terminating processing for one piece of content.

According to the fifth modification of the first embodiment described above, an effect of being able to use content analysis results during reproduction of content is achieved by generating and storing content analysis results in the information processing apparatus 100 even in a state in which the information providing apparatus 200 is not communicable.

Subsequently, the second embodiment will be described.

7. Second Embodiment

[Function Configuration of the Information Processing Apparatus]

When compared with the first embodiment, the second embodiment is different in the function configuration of the information processing apparatus 100. Therefore, the function configuration of the information processing apparatus 100 according to the second embodiment will be described using FIG. 34 and FIG. 35.

Figure 34:
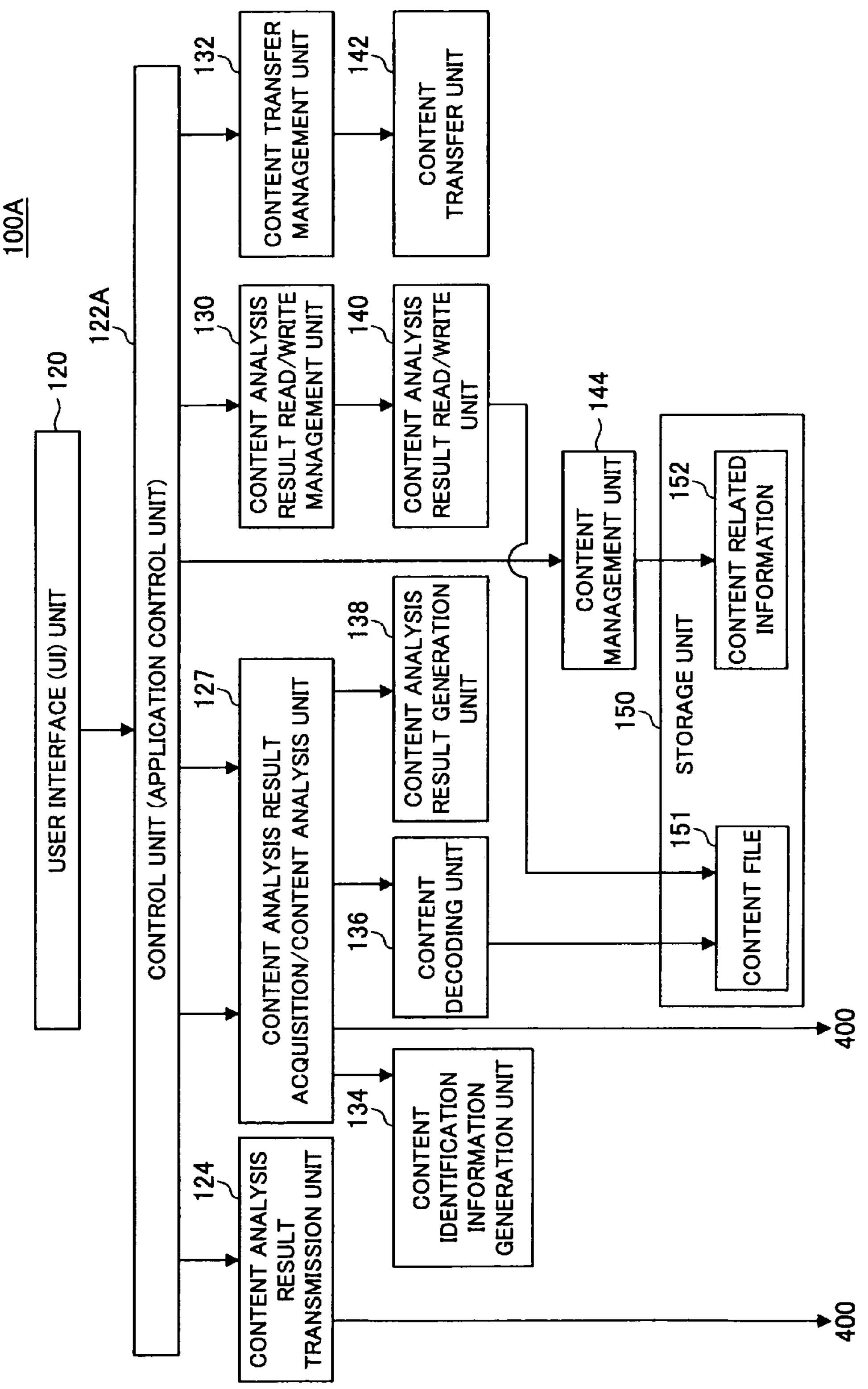
FIG. 34 is a diagram showing the function configuration of the information processing apparatus according to a second embodiment of the present invention.
Figure 35:
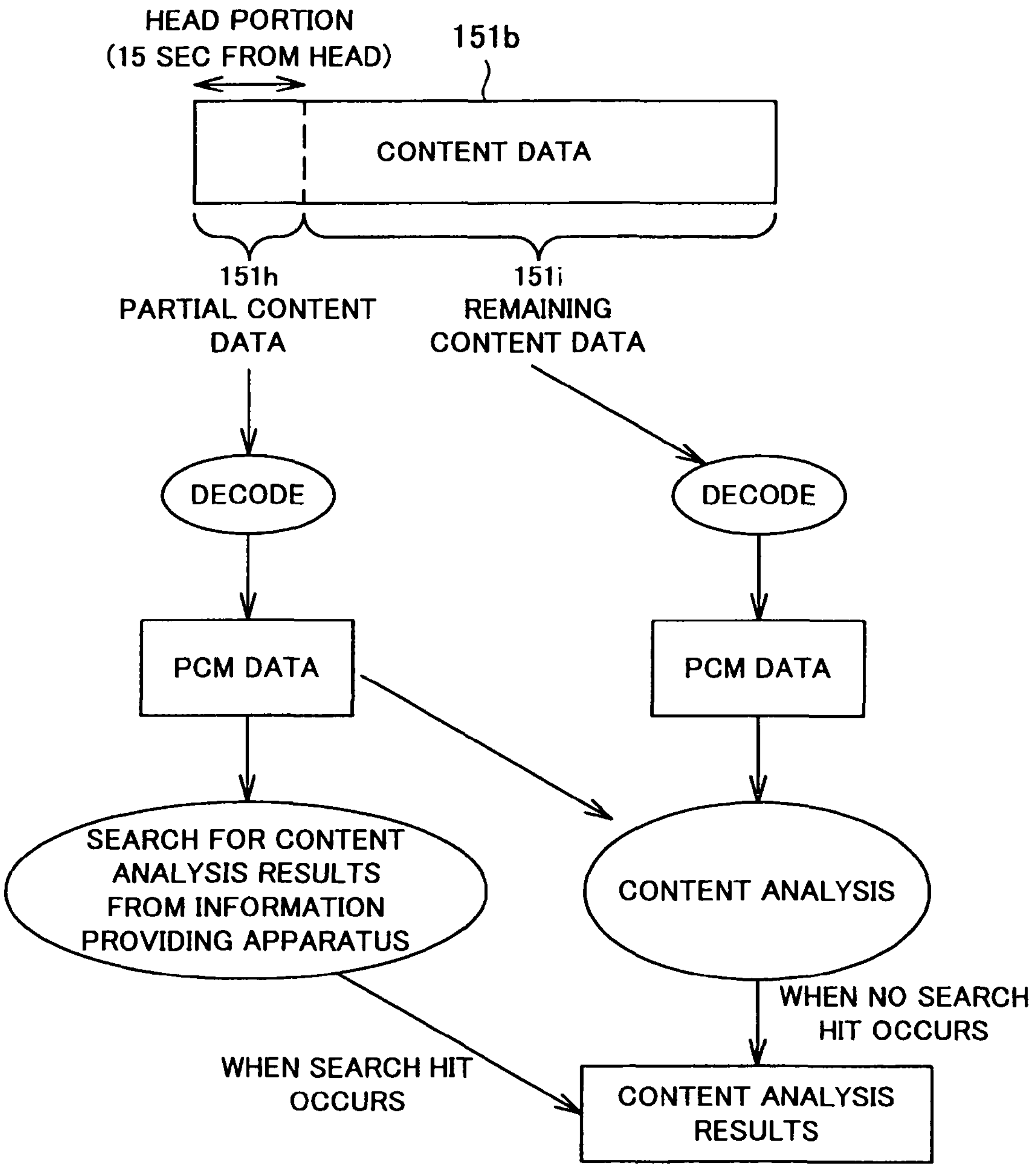
FIG. 35 is a diagram schematically showing processing of the information processing apparatus according to the second embodiment of the present invention.

FIG. 34 is a diagram showing the function configuration of the information processing apparatus 100 according to the second embodiment of the present invention. FIG. 35 schematically shows processing of the information processing apparatus 100 according to the second embodiment of the present invention. As shown in FIG. 34, an information processing apparatus 100A is different in that the control unit 122 in the information processing apparatus 100 according to the first embodiment is replaced by a control unit 122A. Also, the information processing apparatus 100A is different in that the content analysis result acquisition unit 126 and the content analysis unit 128 in the information processing apparatus 100 according to the first embodiment are replaced by a content analysis result acquisition/content analysis unit 127. Therefore, the function of the control unit 122A will be described and also the function of the content analysis result acquisition/content analysis unit 127 will be described.

The content analysis result acquisition/content analysis unit 127 can start analysis of content data while generating content identification information based on partial content data 151*h* corresponding to a portion between the head and a predetermined position of content data stored in the storage unit 150. When generation of content identification information is completed, the content analysis result acquisition/content analysis unit 127 can transmit the content identification information to the information providing apparatus 200. If the information providing apparatus 200 holds content analysis results, which are results of analyzing content data corresponding to the content identification information, the content analysis result acquisition/content analysis unit 127 can stop analysis of content data by receiving content analysis results from the information providing apparatus 200. If the information providing apparatus 200 does not hold any content analysis result, the content analysis result acquisition/content analysis unit 127 can obtain content analysis results by continuing analysis of content data (it is possible to continue with decoding and content analysis of remaining content data 151*i*).

The control unit 122A causes the content analysis result acquisition/content analysis unit 127 to perform processing to generate and transmit content identification information to the information providing apparatus 200 and processing to start analysis of content data corresponding to the content identification information. The control unit 122A determines whether the content analysis result acquisition/content analysis unit 127 has received content analysis results from the information providing apparatus 200. If the control unit 122A determines that the content analysis result acquisition/content analysis unit 127 has received content analysis results from the information providing apparatus 200, the control unit 122A causes the storage unit 150 to store content analysis results by associating with content data stored in the storage unit 150. If the control unit 122A determines that the content analysis result acquisition/content analysis unit 127 has not received content analysis results from the information providing apparatus 200, the control unit 122A causes the storage unit 150 to store content analysis results obtained by the content analysis result acquisition/content analysis unit 127 by associating with content data stored in the storage unit 150. Moreover, the control unit 122A causes the content analysis result transmission unit 124 to perform processing to transmit content analysis results to the information providing apparatus 200.

Figure 36:
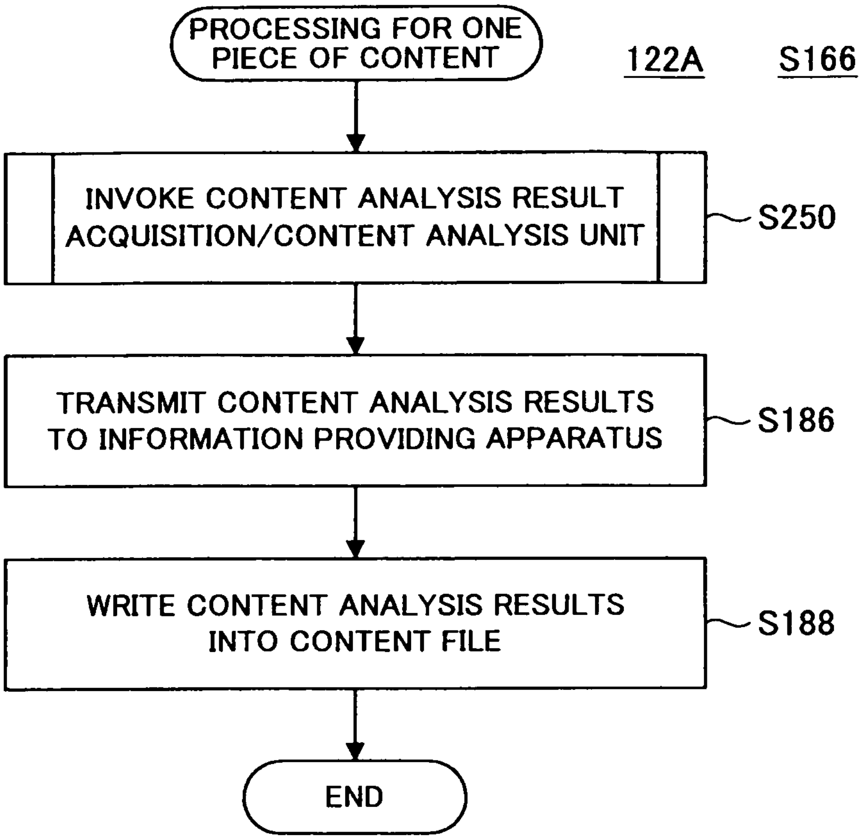
FIG. 36 is a flow chart showing the flow of processing for one piece of content performed by the control unit of the information processing apparatus according to the second embodiment of the present invention.

FIG. 36 is a flow chart showing the flow of processing for one piece of content performed by the control unit 122A of the information processing apparatus 100 according to the second embodiment of the present invention. Processing for one piece of content performed by the control unit 122A of the information processing apparatus 100 according to the second embodiment of the present invention will be described below using FIG. 36.

In the processing for one piece of content, the control unit 122A first invokes the content analysis result acquisition/content analysis unit 127 (step S250). The control unit 122A transmits content analysis results to the information providing apparatus 200 (step S186) and writes content analysis results into the content file 151 (step S188) before terminating processing for one piece of content.

Figure 37:
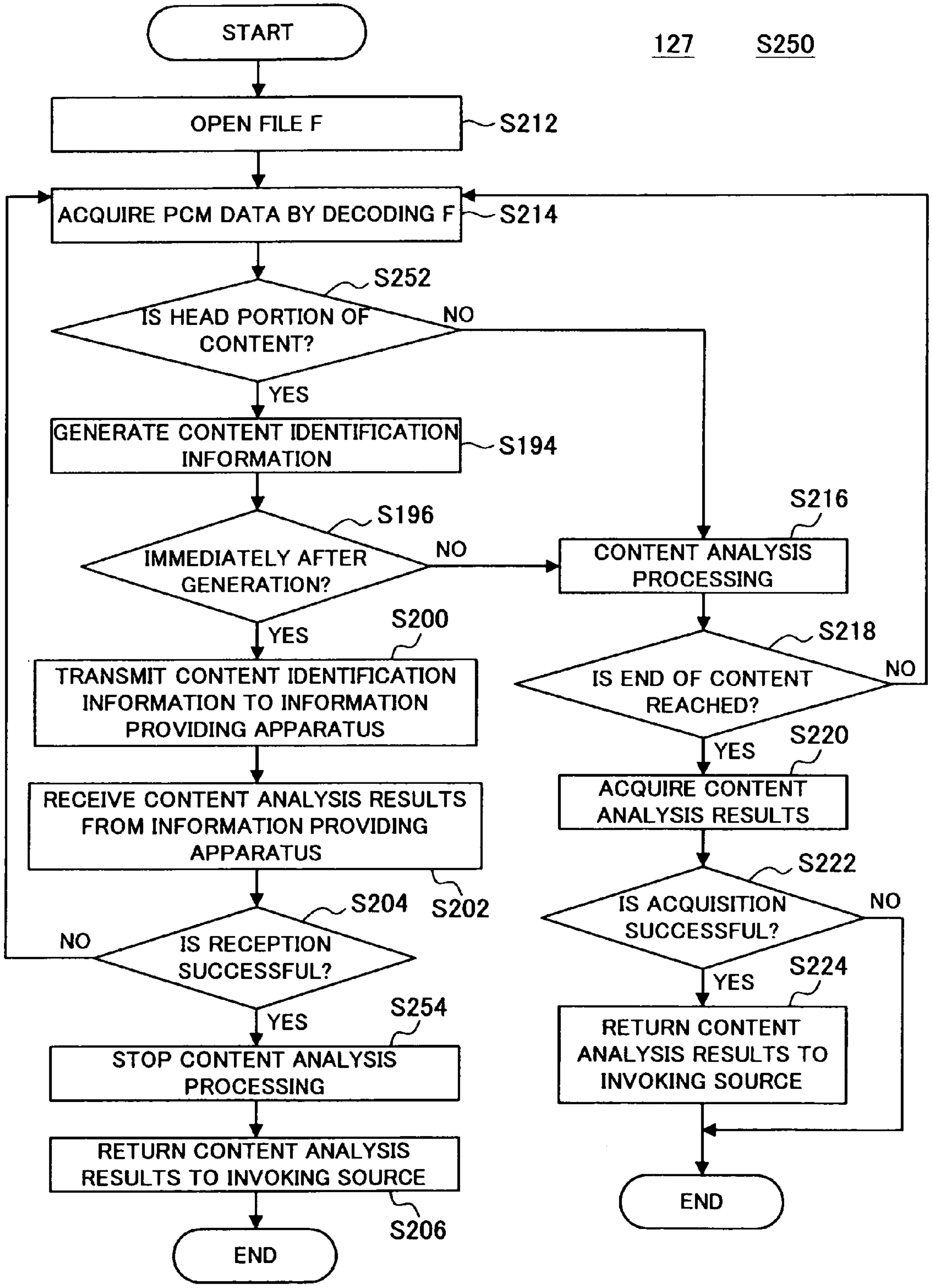
FIG. 37 is a flow chart showing the flow of processing performed by a content analysis result acquisition/content analysis unit of the information processing apparatus according to the second embodiment of the present invention.

FIG. 37 is a flow chart showing the flow of processing performed by the content analysis result acquisition/content analysis unit 127 of the information processing apparatus 100 according to the second embodiment of the present invention. Processing performed by the content analysis result acquisition/content analysis unit 127 of the information processing apparatus 100 according to an embodiment of the present invention will be described below using FIG. 37. This processing corresponds to step S250 shown in FIG. 36.

The content analysis result acquisition/content analysis unit 127 of the information processing apparatus 100 opens the file F (whose content file name is set by the control unit 122A) (step S212) and decodes the file F to acquire PCM data (step S214). Subsequently, the content analysis result acquisition/content analysis unit 127 determines whether the acquired PCM data is a head portion (the partial content data 151*h*) of content (step S252). If the content analysis result acquisition/content analysis unit 127 determines that the acquired PCM data is a head portion of content ("YES" at step S252), the content analysis result acquisition/content analysis unit 127 generates content identification information based on the acquired PCM data (step S194).

If the content analysis result acquisition/content analysis unit 127 determines that it is not immediately after generation of content identification information is completed ("NO" at step S196), the content analysis result acquisition/content analysis unit 127 performs content analysis processing (step S216). Here, it is not immediately after generation of content identification information is completed means that it is before generation of content is completed or step S196 is entered for the second time or later after completion. Then, the content analysis result acquisition/content analysis unit 127 determines whether the end of content is reached (step S218). If the content analysis result acquisition/content analysis unit 127 determines that the end of content is not reached ("NO" at step S218), the content analysis result acquisition/content analysis unit 127 returns to step S214. If the content analysis result acquisition/content analysis unit 127 determines that the end of content is reached ("YES" at step S218), the content analysis result acquisition/content analysis unit 127 acquires content analysis results (step S220). If the content analysis result acquisition/content analysis unit 127 determines that acquisition of content analysis results failed ("NO" at step S222), the content analysis result acquisition/content analysis unit 127 terminates processing. If the content analysis result acquisition/content analysis unit 127 determines that content analysis results have successfully been acquired ("YES" at step S222), the content analysis result acquisition/content analysis unit 127 returns content analysis results to the invoking source (step S224) before terminating processing.

If the content analysis result acquisition/content analysis unit 127 determines that it is immediately after generation of content identification information is completed ("YES" at step S196), the content analysis result acquisition/content analysis unit 127 transmits the content identification information to the information providing apparatus 200 (step S200) and receives content analysis results from the information providing apparatus 200 (step S202). If the content analysis result acquisition/content analysis unit 127 determines that reception of content analysis results failed ("NO" at step S204), the content analysis result acquisition/content analysis unit 127 returns to step S214. If the content analysis result acquisition/content analysis unit 127 determines that content analysis results have successfully been received ("NO" at step S204), the content analysis result acquisition/content analysis unit 127 stops content analysis processing (step S254) and returns content analysis results to the invoking source (step S206) before terminating processing.

According to the second embodiment described above, decode processing is performed once on a head portion of content data and resultant PCM data can be used for generation of content identification information and content analysis. Accordingly, even if there are many pieces of music that are not analyzed, an effect of being able to reduce the total processing time can be achieved. This is also effective when the load of decode processing is heavy.

It should be understood by those skilled in the art that various modifications, combinations, sub-combinations and alterations may occur depending on design requirements and other factors insofar as they are within the scope of the appended claims or the equivalents thereof.

In the embodiments described above, for example, there is no need to necessarily process each step in the information processing apparatus 100 chronologically along the sequence described in drawings. For example, each step in processing of the information processing apparatus 100 may contain processing performed in parallel or individually (for example, parallel processing or processing by an object).

What is claimed is:

1. An information processing apparatus, comprising:

a storage unit that is configured to store content analysis results, which are results of analyzing content data, and store the content data and content identification information corresponding to the content data;

one or more processors configured as:

a content analysis result acquisition unit that acquires and transmits the content identification information stored in the storage unit to another apparatus, and, when the other apparatus holds content analysis results, which are results of analyzing content data corresponding to the content identification information, is configured to receive the content analysis results from the other apparatus;

a content analysis unit configured to obtain content analysis results by analyzing the content data stored in the storage unit;

a content analysis result transmission unit configured to transmit content analysis results obtained by the content analysis unit to the other apparatus; and a control unit that causes the content analysis result acquisition unit to perform processing to acquire and transmit the content identification information stored in the storage unit to the other apparatus, determines whether the content analysis result acquisition unit has received the content analysis results from the other apparatus, and, when it is determined that the content analysis result acquisition unit has received the content analysis results from the other apparatus, causes the storage unit to store the content analysis results in association with the content data stored in the storage unit, and, when it is determined that the content analysis result acquisition unit has not received the content analysis results from the other apparatus, causes the content analysis unit to perform processing to obtain content analysis results by analyzing the content data stored in the storage unit to cause the storage unit to store the content analysis results obtained by the content analysis unit in association with the content data stored in the storage unit, and, also causes the content analysis result transmission unit to perform processing to transmit the content analysis results to the other apparatus; and, wherein, analyzing the content data stored in the storage unit includes generating one or more content features extracted from the analysis of the content data and storing the one or more content features as part of the content analysis results, and further includes storing, as another part of the content analysis results, an identifier uniquely identifying the information processing apparatus that generated the one or more content features.

2. The information processing apparatus according to claim 1, wherein the control unit determines whether content analysis results are already stored in the storage unit in association with the content data stored in the storage unit before causing the content analysis unit to perform processing to obtain content analysis results by analyzing the content data stored in the storage unit, and, when it is determined that the content analysis results are already stored in the storage unit, omits processing to cause the content analysis result to perform processing to obtain content analysis results by analyzing the content data stored in the storage unit and processing to cause the storage unit to store the content analysis results obtained by the content analysis unit in association with the content data stored in the storage unit.

3. The information processing apparatus according to claim 1, wherein the control unit determines whether content analysis results are already stored in the storage unit in association with the content data stored in the storage unit before causing the content analysis result acquisition unit to perform processing to acquire and transmit the content identification information stored in the storage unit to the other apparatus, and, when it is determined that the content analysis results are already stored in the storage unit, omits processing to cause the content analysis result acquisition unit to perform processing to acquire and transmit the content identification information stored in the storage unit to the other apparatus, processing to determine whether the content analysis result acquisition unit has received the content analysis results from the other apparatus, processing to cause the storage unit to store the content analysis results received by the content analysis result acquisition unit from the other apparatus in association with the content data stored in the storage unit, processing to cause the content analysis unit to perform processing to obtain content analysis results by analyzing the content data stored in the storage unit, processing to cause the storage unit to store the content analysis results obtained by the content analysis unit in association with the content data stored in the storage unit, and processing to cause the content analysis result transmission unit to perform processing to transmit the content analysis results obtained by the content analysis unit to the other apparatus.

4. The information processing apparatus according to claim 1, wherein the content analysis result acquisition unit is further configured for receiving content analysis result transmission request information indicating a request of transmission of content analysis results from the other apparatus and, the control unit when it is determined that the content analysis result acquisition unit has received content analysis results from the other apparatus, causes the storage unit to store the content analysis results in association with the content data stored in the storage unit, and determines whether the content analysis result acquisition unit has received the content analysis result transmission request information from the other apparatus, and, when it is determined that the content analysis result acquisition unit has received the content analysis result transmission request information from the other apparatus, causes the content analysis unit to perform processing to obtain content analysis results by analyzing the content data stored in the storage unit and causes the content analysis result transmission unit to perform processing to transmit the content analysis results to the other apparatus.

5. The information processing apparatus according to claim 2, wherein the storage unit is further configured for storing apparatus identification information corresponding to an apparatus that analyzes the content data and, the control unit when the storage unit is caused to store the content analysis results in association with the content data stored in the storage unit, causes the storage unit to store apparatus identification information corresponding to a local apparatus in association with the content analysis results, and, when it is determined that the content analysis results are already stored in the storage unit, acquires apparatus identification information corresponding to the content analysis results from the storage unit, and, when it is determined that the apparatus identification information does not correspond to the local apparatus, does not omit processing to cause the content analysis unit to perform processing to obtain content analysis results by analyzing the content data stored in the storage unit and processing to cause the storage unit to store the content analysis results obtained by the content analysis unit in association with the content data stored in the storage unit.

6. The information processing apparatus according to claim 1, wherein the control unit before causing the content analysis result acquisition unit to perform processing to acquire and transmit the content identification information stored in the storage unit to the other apparatus, determines whether the other apparatus is communicable, and, when it is determined that the other apparatus is not communicable, omits processing to cause the content analysis result acquisition unit to perform processing to acquire and transmit the content identification information stored in the storage unit to the other apparatus, determines that the content analysis result acquisition unit has not received the content analysis results from the other apparatus and, as a result, causes the content analysis unit to perform processing to obtain content analysis results by analyzing the content data stored in the storage unit, causes the storage unit to store the content analysis results obtained by the content analysis unit in association with the content data stored in the storage unit, omits processing to cause the content analysis result transmission unit to perform processing to transmit the content analysis results obtained by the content analysis unit to the other apparatus, causes the content analysis result acquisition unit to perform processing to acquire and transmit the content identification information stored in the storage unit to the other apparatus when the other apparatus becomes communicable, determines whether the content analysis result acquisition unit has received the content analysis results from the other apparatus, and, when it is determined that the content analysis result acquisition unit has not received the content analysis results from the other apparatus, causes the content analysis result transmission unit to perform processing to transmit content analysis results stored in the storage unit in association with the content data stored in the storage unit to the other apparatus.

7. An information processing apparatus, comprising:

a storage unit that is configured for storing content analysis results, which are results of analyzing content data, and storing the content data;

one or more processors configured as:

a content analysis result acquisition/content analysis unit that is configured to start analysis of the content data while generating content identification information based on partial content data corresponding from a head to a predetermined position of the content data stored in the storage unit, transmit the content identification information to another apparatus when generation of the content identification information is completed, and, when content analysis results, which are results of analyzing content data corresponding to the content identification information, are held by the other apparatus, stop analysis of the content data by receiving the content analysis results from the other apparatus, and, when the other apparatus does not hold the content analysis results, obtain content analysis results by continuing analysis of the content data;

a content analysis result transmission unit configured for transmitting content analysis results obtained by analysis by the content analysis result acquisition/content analysis unit to the other apparatus; and a control unit that causes the content analysis result acquisition/content analysis unit to perform processing to generate and transmit the content identification information to the other apparatus and processing to start analysis of content data corresponding to the content identification information, determines whether the content analysis result acquisition/content analysis unit has received the content analysis results from the other apparatus and when it is determined that the content analysis result acquisition/content analysis unit has received the content analysis results from the other apparatus, causes the storage unit to store the content analysis results in association with the content data stored in the storage unit and when it is determined that the content analysis result acquisition/content analysis unit has not received the content analysis results from the other apparatus, causes the storage unit to store the content analysis results obtained by the content analysis result acquisition/content analysis unit in association with the content data stored in the storage unit and also causes the content analysis result transmission unit to perform processing to transmit the content analysis results to the other apparatus; and, wherein, analyzing the content data includes generating one or more content features extracted from the analysis of the content data and storing the one or more content features as part of the content analysis results, and further includes storing, as another part of the content analysis results, an identifier uniquely identifying the information processing apparatus that generated the one or more content features.

8. A non-transitory computer storage medium storing an information processing program to cause a computer to function as an information processing apparatus, the information processing program comprising one or more instructions for:

storing content analysis results, which are results of analyzing content data, and storing the content data and content identification information corresponding to the content data in a storage unit;

acquiring and transmitting the content identification information stored in the storage unit to another apparatus and, when the other apparatus holds content analysis results, which are results of analyzing content data corresponding to the content identification information, receiving the content analysis results from the other apparatus;

obtaining the content analysis results by analyzing the content data stored in the storage unit;

transmitting the content analysis results to the other apparatus; and acquiring and transmitting the content identification information stored in the storage unit to the other apparatus, determining whether the content analysis results have been received from the other apparatus, and, when it is determined that the content analysis results have been received from the other apparatus, storing the content analysis results in association with the content data stored in the storage unit, and, when it is determined that the content analysis results have not been received from the other apparatus, obtaining the content analysis results by analyzing the content data stored in the storage unit, storing the content analysis results in association with the content data stored in the storage unit, and, transmitting the content analysis results to the other apparatus; and, wherein, analyzing the content data includes generating one or more content features extracted from the analysis of the content data and storing the one or more content features as part of the content analysis results, further includes storing, as another part of the content analysis results, an identifier uniquely identifying the information processing apparatus that generated the one or more content features.

9. An information providing apparatus, comprising:

a storage unit configured to storing content identification information corresponding to content data and content analysis results, which are results of analyzing the content data;

one or more processors configured as:

a content analysis result search unit that, when content identification information is received from another apparatus, determines whether content analysis results corresponding to the content identification information are stored in the storage unit and, when it is determined that the content analysis results are stored in the storage unit, acquires and transmits the content analysis results to the other apparatus; and a content analysis result registration unit that, when the content analysis result search unit does not transmit the content analysis results, receives content analysis results from the other apparatus and causes the storage unit to store the content analysis results in association with the content identification information received by the content analysis result search unit; and, wherein, the content analysis results received from the other apparatus include, as part of the content analysis results, one or more content features of the content data generated from the analysis of the content data by the other apparatus and further include, as another part of the content analysis results, an identifier uniquely identifying the other apparatus that generated the one or more content features.

10. The information providing apparatus according to claim 9, further comprising a threshold storage unit that stores a threshold, wherein the content analysis result search unit determines whether content analysis results corresponding to the content identification information received from the other apparatus are stored in the storage unit and when it is determined that the content analysis results are stored in the storage unit, determines whether a number of content analysis results corresponding to the content identification information is less than the threshold, and, when it is determined that the number of content analysis results is less than the threshold, omits processing to transmit the content analysis results to the other apparatus.

11. The information providing apparatus according to claim 9, further comprising a threshold storage unit that stores a threshold, wherein the content analysis result search unit transmits content analysis result transmission request information indicating a request of transmission of content analysis results to the other apparatus, determines whether content analysis results corresponding to the content identification information received from the other apparatus are stored in the storage unit, and, when it is determined that the content analysis results are stored in the storage unit, determines whether a number of content analysis results corresponding to the content identification information is less than the threshold, and, when it is determined that the number of content analysis results is less than the threshold, transmits the content analysis results to the other apparatus and also transmits the content analysis result transmission request information to the other apparatus, and, when the content analysis result transmission request information is transmitted to the other apparatus, receives content analysis results from the other apparatus.

12. A non-transitory computer storage medium storing an information providing program to cause a computer to function as an information providing apparatus, the information providing program comprising one or more instructions for:

storing content identification information corresponding to content data and content analysis results, which are results of analyzing the content data, in a storage unit;

when content identification information is received from another apparatus, determining whether content analysis results corresponding to the content identification information are stored in the storage unit and, when it is determined that the content analysis results are stored in the storage unit, acquiring and transmitting the content analysis results to the other apparatus; and when the content analysis results are not transmitted to the other apparatus, receiving content analysis results from the other apparatus and storing the content analysis results in association with the content identification information received by the content analysis result search unit in the storage unit; and, wherein, the content analysis results received from the other apparatus include, as part of the content analysis results, one or more content features of the content data generated from the analysis of the content data by the other apparatus and further include, as another part of the content analysis results, an identifier uniquely identifying the other apparatus that generated the one or more content features.

* * * * *